United States Patent
Cunningham et al.

(10) Patent No.: US 6,272,438 B1
(45) Date of Patent: Aug. 7, 2001

(54) VIBRATING CONDUIT PARAMETER SENSORS, METHODS AND COMPUTER PROGRAM PRODUCTS FOR GENERATING RESIDUAL-FLEXIBILITY-COMPENSATED MASS FLOW ESTIMATES

(75) Inventors: Timothy J. Cunningham, Boulder; David F. Normen, Louisville, both of CO (US); Stuart J. Shelley, Cincinnati, OH (US)

(73) Assignee: Micro Motion, Inc., Boulder, CO (US)

( * ) Notice: Subject to any disclaimer, the term of this patent is extended or adjusted under 35 U.S.C. 154(b) by 0 days.

(21) Appl. No.: 09/129,746

(22) Filed: Aug. 5, 1998

(51) Int. Cl.⁷ .................................................. G01F 23/28
(52) U.S. Cl. ................................. 702/56; 73/860.38; 73/3
(58) Field of Search ..................... 73/860.38, 3, 861.18; 702/45, 100, 56, 33, 54

(56) References Cited

U.S. PATENT DOCUMENTS 4,422,338 * 12/1983 Smith ............................... 73/861.38
4,823,613 * 4/1989 Cage et al. ........................ 73/861.38

FOREIGN PATENT DOCUMENTS

0848234 A2    6/1998  (EP).

* cited by examiner

Primary Examiner—Marc S. Hoff
Assistant Examiner—Edward Raymond
(74) Attorney, Agent, or Firm—Chrisman, Bynum & Johnson. P.C.

(57) ABSTRACT

A process parameter associated with a material contained in a conduit is estimated by estimating a real normal modal residual flexibility component associated with a real normal mode of motion of the conduit. A plurality of motion signals representing motion of the conduit is received. A residual-flexibility-compensated estimate of mass flow is generated from the received plurality of motion signals and the estimated real normal modal residual flexibility component. Related apparatus and computer program products are also described.

59 Claims, 16 Drawing Sheets

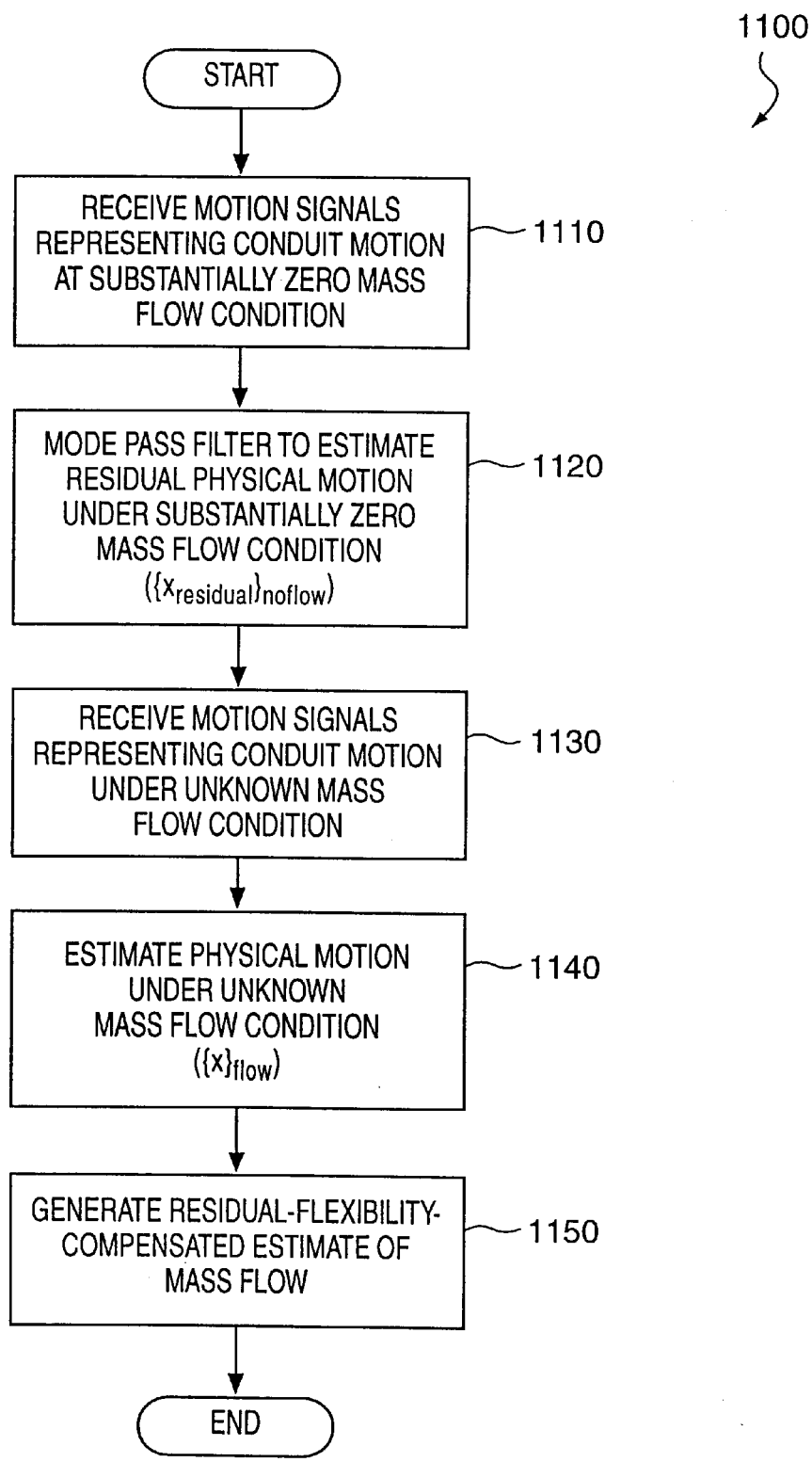

VIBRATING CONDUIT PARAMETER SENSORS, METHODS AND COMPUTER PROGRAM PRODUCTS FOR GENERATING RESIDUAL-FLEXIBILITY-COMPENSATED MASS FLOW ESTIMATES

BACKGROUND OF THE INVENTION

1. Field of the Invention

The present invention relates to process parameter sensors, operating methods and computer program products, and more particularly, to vibrating conduit parameter sensors, operating methods and computer program products.

2. Statement of the Problem

Coriolis effect mass flowmeters are commonly used to measure mass flow and other information for materials flowing through a conduit. Exemplary Coriolis flowmeters are disclosed in U.S. Pat. Nos. 4,109,524 of Aug. 29, 1978, 4,491,025 of Jan. 1, 1985, and Re. 31,450 of Feb. 11, 1982, all to J. E. Smith et al. These flowmeters typically include one or more conduits having a straight or a curved configuration. Each conduit may be viewed as having a set of vibration modes, including, for example, simple bending, torsional, radial and coupled modes. In a typical mass flow measurement application, each conduit is driven to oscillate at resonance in one of its natural modes as a material flows through the conduit. The vibration modes of the vibrating, material-filled system are effected by the combined mass and stiffness characteristics of the conduits and the characteristics of the material flowing within the conduits.

A typical component of a Coriolis flowmeter is the drive or excitation system. The drive system operates to apply a periodic physical force to the conduit that causes the conduit to oscillate. The drive system typically includes at least one actuator mounted to the conduit(s) of the flowmeter. The actuator may comprise one of many well known electromechanical devices, such as a voice coil device having a magnet mounted to a first conduit and a wire coil mounted to a second conduit, in an opposing relationship to the magnet. A driver typically applies a periodic, e.g., a sinusoidal or square wave, drive signal to the actuator coil. The periodic drive signal causes the actuator to drive the two conduits in an opposing periodic pattern.

When there is effectively "zero" flow through a driven flowmeter conduit, points along the conduit tend to oscillate with approximately the same phase or a "zero-flow" phase with respect to the driver, depending on the mode of the driven vibration. As material begins to flow from an inlet of the flowmeter, through the conduit and out of an outlet of the flowmeter, Coriolis forces arising from the material flow tend to induce phase shifts between spatially separate points along the conduit, with the phase on the inlet side of the conduit generally lagging the actuator and the phase on the outlet side of the conduit generally leading the actuator The phase shift induced between two locations on the conduit is approximately proportional to the mass flow rate of material through the conduit.

Unfortunately, the accuracy of measurements obtained using conventional phase shift or time delay methods can be compromised by nonlinearities and asymmetries in the flowmeter structure, as well as by vibration introduced into the flowmeter structure by external sources such as pumps. These effects may be reduced, for example, by using balanced mechanical designs that reduce the effects of external vibration and by using frequency domain filtering to remove frequency components associated with undesirable vibrations. However, mechanical design approaches may be constrained by geometric considerations, and frequency domain filtering may be ineffective at removing unwanted vibrational energy that occurs at or near resonant frequencies of interest such as the drive frequency used to excite the conduit.

One type of error commonly encountered in mass flow rate measurement applications is "zero offset." As mentioned above, mass flow rate measurements typically involve determining a phase or time difference between motion signals produced by transducers on the sensor conduit structure. Zero offset represents a bias or offset in these phase or time differences measurement, such that a zero mass flow rate does not produce a zero phase or time difference.

To reduce zero offset, error, conventional mass flow measurement techniques typically measure zero offset as a phase or time difference between motion signals measured under a controlled zero mass flow condition. Phase or time difference measurements conducted under other flow conditions are then compensated according to the measured zero-flow phase or time difference to produce more accurate results.

These techniques have potential disadvantages, however. Changes in process temperatures or sensor mounting conditions may cause the zero offset to drift over time and lead to measurement errors. To compensate for this drift, it may be necessary to periodically re-measure zero offset. This may be inconvenient, as conventional zero offset compensation techniques may require that flow be stopped to generate an updated zero offset measurement.

SUMMARY OF THE INVENTION

In light of the foregoing, it is an object of the present invention to provide mass flow sensors and methods of determining mass flow which are less sensitive to changes in process and mounting conditions.

This and other objects, features and advantages are provided according to the present invention by methods, apparatus and computer program products in which "residual flexibility," i.e., residual motion attributable to off-resonance contributions of real normal modes, is determined by resolving motion of a vibrating conduit of a mass flow sensor into real normal modal components. A real normal modal residual flexibility component associated with at least one real normal mode of the conduit motion is estimated and used to generate a residual-flexibility-compensated estimate of mass flow.

According to an aspect of the present invention, the real normal modal residual flexibility component is estimated from signals representing motion of the conduit at a substantially zero mass flow condition. According to a related "dynamic zeroing" aspect, two real normal modal residual flexibility components are determined, including a "static" real normal modal residual flexibility component measured at zero flow and a "dynamic" real normal modal residual flexibility component which is measurable under non-zero mass flow conditions. The two real normal modal residual flexibility components are combined to provide an estimate of residual flexibility that is used generate a residual-flexibility-compensated estimate of mass flow. Because the dynamic real normal modal residual flexibility component may be estimated as material flows through the sensor, the estimate of residual flexibility can be updated to compensate for changes in the sensor's structural dynamics without requiring stoppage of flow.

According to another aspect of the present invention, a function that describes motion of the vibrating conduit in a real normal mode as function of frequency is identified. The identified function is then used to estimate a residual real normal modal component associated with the real normal mode by fitting measurements of actual conduit motion, e.g., motion at non-zero mass flow rates, to the identified function. For example, a plurality of values of motion of the sensor conduit in a real normal mode may be measured at a plurality of selected frequencies, and these values used to determine a mode scaling for the real normal mode such that motion of the conduit in the real normal mode at an off-resonant frequency, e.g., an excitation frequency of the sensor, can be estimated. This measurement of residual motion can then be used to generate a residual-flexibility-compensated estimate of mass flow through the sensor.

The present invention arises from the realization that residual flexibility in a mass flow sensor may be attributed to off-resonance contributions of various vibrational modes of the sensor structure. Using real normal modal decomposition techniques, the present invention can accurately measure conduit motion associated with off-resonant real normal modal motion, and thereby provide an accurate measurement of residual flexibility for use in generating more accurate measurements of mass flow. According to aspects of the present invention, the estimate of off-resonant conduit motion can be made without requiring zero mass flow in the sensor conduit.

In particular, according to the present invention, a process parameter associated with a material contained in a conduit is estimated by estimating a real normal modal residual flexibility component associated with a real normal mode of motion of the conduit. A plurality of motion signals representing motion of the conduit is received. A residual-flexibility-compensated estimate of mass flow is generated from the received plurality of motion signals and the estimated real normal modal residual flexibility component.

According to an aspect of the present invention, the conduit is excited at an excitation frequency. A real normal modal residual flexibility component associated with the real normal mode at the excitation frequency is estimated. A plurality of motion signals representing motion of the conduit in response to the excitation is received and motion of the conduit at the excitation frequency is determined from the received plurality of motion signals. A residual-flexibility-compensated estimate of mass flow is generated from the determined motion at the excitation frequency and the estimated real normal modal residual flexibility component.

According to another aspect of the invention, a first plurality of motion signals representing motion of the conduit under a substantially zero mass flow condition is received and processed to resolve the motion of the conduit under the substantially zero mass flow condition into a plurality of real normal modal components. A real normal modal residual flexibility component is estimated from the resolved plurality of real normal modal components. A second plurality of motion signals representing motion of the conduit is received and a residual-flexibility-compensated estimate of mass flow is generated from the received second plurality of motion signals and the estimated real normal modal residual flexibility component.

Estimation of residual flexibility and mass flow may be performed in a physical coordinate domain or a modal coordinate domain. The first plurality of motion signals may be mode pass filtered to produce a mode pass filtered representation of the conduit motion under the substantially zero mass flow condition, and an estimate of residual physical motion associated with a real normal mode may be generated from the mode pass filtered representation of conduit motion. Alternatively, the first plurality of motion signals may be processed to estimate residual real normal modal motion under the substantially zero mass flow condition.

According to a related "dynamic zeroing" aspect of the present invention, a first real normal modal residual flexibility component associated with a first real normal mode of conduit motion under the substantially zero mass flow condition is estimated. A second real normal modal residual flexibility component associated with a second real normal mode of conduit motion under a non-zero mass flow condition is estimated. A residual-flexibility-compensated estimate of mass flow is generated from the received second plurality of motion signals, the estimated first real normal modal residual flexibility component and the estimated second real normal modal residual flexibility component. The first real normal mode preferably is more highly correlated with flow of material in the conduit than the second real normal mode.

According to yet another aspect of the present invention, a function operative to describe motion of the conduit in a real normal mode as function of frequency is identified. A first value representing motion of the vibrating conduit at a selected frequency is determined. A real normal modal residual flexibility component associated with the real normal mode is estimated by fitting the first value to the identified function. A plurality of motion signals representing motion of the conduit is received and a residual-flexibility-compensated estimate of mass flow is generated from the received second plurality of motion signals and the estimated real normal modal residual flexibility component.

In a modal coordinate domain embodiment, a real normal modal residual flexibility component is estimated by determining a scaling transformation relating the first value to the identified function, and estimating a real normal modal residual flexibility component associated with the real normal mode from the identified function and the determined scaling transformation. A residual-flexibility-compensated estimate of mass flow is generated from the estimated real normal modal residual flexibility component in a modal coordinate domain.

In a mode pass filtering embodiment, residual physical motion associated with a real normal mode is estimated from a frequency response function. A residual-flexibility-compensated estimate of mass flow is generated by mode pass filtering a received plurality of motion signals to produce a mode-pass-filtered representation of conduit motion as a material flows therethrough, and generating a residual-flexibility-compensated estimate of mass flow from the mode pass filtered representation and the estimated residual physical motion.

Related apparatus and computer program products for generating a residual-flexibility-compensated mass flow estimate for material in a vibrating conduit are also described.

BRIEF DESCRIPTION OF THE DRAWINGS

FIGS. 7–11 are flowchart illustrations and schematic diagrams illustrating operations for generating a residualflexibility-compensated estimate of mass flow according to aspects of the present invention.

DETAILED DESCRIPTION OF EMBODIMENTS

Figure 1:
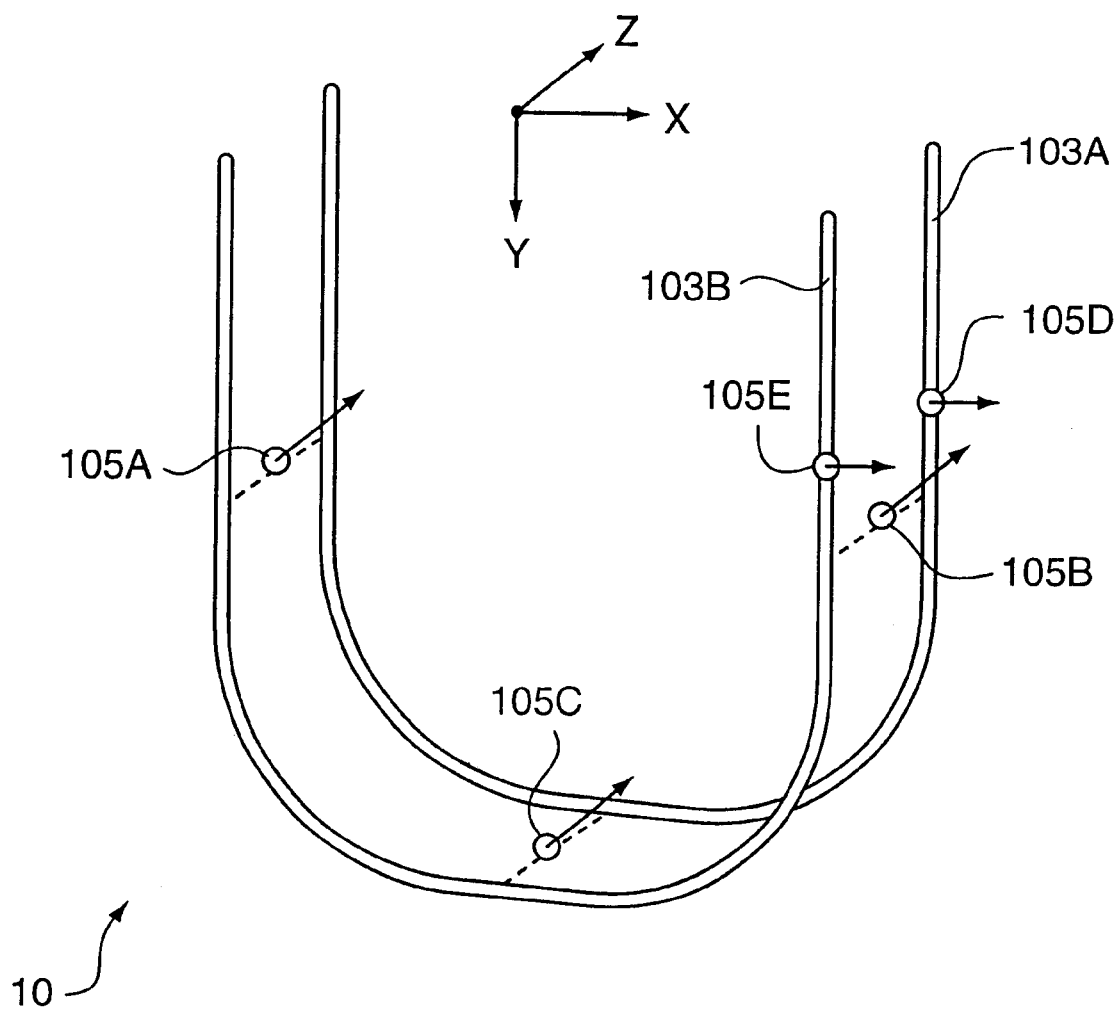
FIG. 1 illustrates an exemplary sensor conduit structure.

The present invention now will be described more fully hereinafter with reference to the accompanying drawings, in which embodiments of the invention are shown. Those skilled in the art will appreciate that the invention may be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout.

In embodiments described herein, motion signals representing motion of a sensor conduit are processed to resolve the conduit motion into a plurality of real normal modal components. Real normal modal decomposition may be implemented in a number of ways. For example, a mode pass filter may be employed to pass components of sensor conduit motion that are associated with a set of desired real normal. Although modal responses corresponding to the conduit motion need not be explicitly determined, the mode pass filtering nonetheless "resolves" the conduit motion into respective components associated with respective real normal modes. Alternatively, real normal modal motion, i.e., motion in the coordinate systems of a plurality of single degree of freedom (SDOF) systems, can be explicitly estimated from the motion signals and used to generate process parameter estimates.

I. Overview

A. Modal Behavior of a Sensor Conduit

As discussed in a U.S. patent application entitled "*Vibrating Conduit Parameter Sensors, Methods and Computer Program Products Utilizing Real Normal Modal Decomposition,*" filed Jul. 16, 1998, and assigned to the assignee of the present application, behavior of a vibrating structure such as a Coriolis flowmeter conduit may be described in terms of one or more natural or real normal modes having associated natural frequencies of vibration. These real normal modes and the associated natural frequencies may be mathematically described by eigenvectors and associated eigenvalues, the eigenvectors being unique in relative magnitude but not absolute magnitude and orthogonal with respect to the mass and stiffness of the structure. The linearly independent set of vectors may be used as a transformation to uncouple equations that describe the structure's motion.

In particular, the response of the structure to an excitation can be represented as a superposition of scaled modes, the scaling representing the contribution of each mode to the motion of the structure. Depending on the excitation, some modes may contribute more than others. Some modes may be undesirable because they may contribute energy at the resonant frequency of a desired mode and therefore may corrupt measurements taken at the resonant frequency of the desired mode, such as phase difference measurements taken at the excitation frequency.

A sensor conduit structure with negligible damping and zero flow may be assumed to have purely real natural or normal modes of vibration, i.e., in each mode, each point of the structure reaches maximum displacement simultaneously. However, a real conduit having non-negligible damping and a material flowing therethrough has a generally complex response to excitation, i.e., points of the structure generally do not simultaneously reach maximum amplitude. The motion of the conduit structure may be described as a complex mode having real and imaginary components or, alternatively, magnitude and phase components. Coriolis forces imparted by the flowing material introduce the complexity into the motion of the sensor conduit.

Even if complex, motion of a conduit structure can be described as a superposition of scaled natural or "normal" modes. To represent complex motion, complex scaling coefficients are used in combining the constituent real normal modes. Particular real normal modes may be closely correlated with the imaginary component of the complex mode while being significantly less correlated with the real component of the complex mode. Accordingly, these particular real normal modes may be more closely correlated with the Coriolis forces associated with the material in the sensor conduit, and thus can provide information for generating an accurate estimate of a parameter, e.g., mass flow, associated with the material.

As an illustrative example, a dual curved tube 3-inch Coriolis flowmeter was experimentally analyzed. A conceptual model of the conduit structure of this meter is illustrated in FIG. 1. Conventional velocity transducers 105A, 105B, 105C, oriented to measure velocity in a direction z, were positioned at respective left, right and drive locations on the conduit assembly 10. Respective accelerometers 105D, 105E were placed on respective ones of the conduits 103A, 103B, near the right transducer location, and were oriented to measure lateral acceleration along a direction x. The outputs of the accelerometers 105D, 105E were integrated to produce lateral absolute velocity information.

A response vector $\{x_{response}\}$ can be constructed from the outputs of the motion transducers 105A–E:

$$\{x_{response}\} = \begin{bmatrix} \text{right response, } z \\ \text{drive response, } z \\ \text{left response, } z \\ \text{skewed lateral response, } xz \\ \text{lateral response, } x \end{bmatrix}, \quad (1)$$

where the skewed lateral response is a response along a direction 45 degrees with respect to the x and z axes. A real normal modal matrix $[\Phi]$, i.e., a real normal modal transformation matrix relating the physical motion vector $\{x_{response}\}$ (in "physical" coordinates) to a real normal modal motion vector $\{\eta\}$ (in "modal" coordinates), may be identified such that:

$$\{x_{response}\} = [\Phi]\{\eta\}. \quad (2)$$

The real normal modal transformation matrix $[\Phi]$ can be identified using a number of techniques. For example, trial and error or inverse techniques may be used as described in U.S. patent application Ser. No. 08/890,785, filed Jul. 11, 1997 and assigned to the assignee of the present application, and in a U.S. patent application Ser. No. 09/030,453, filed Feb. 25, 1998 and assigned to the assignee of the present application.

For the exemplary conduit structure 10 of FIG. 1, a real normal modal transformation matrix $[\Phi]$ was experimentally determined:

$$[\Phi] = \begin{bmatrix} 5.893 & 0.033 & -0.198 & -11.958 & 11.95 \\ 14.973 & 0.085 & -0.68 & -7.666 & -10.388 \\ 6.024 & -0.15 & -0.169 & 12.312 & 12.239 \\ 1.891 & 0.84 & 1.33 & 3.6 & 3.864 \\ 0.124 & 1.728 & -3.587 & 0.198 & 0.232 \end{bmatrix} \left( \frac{lbf \cdot sec^2}{in} \right)^{\frac{1}{2}} \quad (3)$$

From left to right, the columns of the real normal modal transformation matrix $[\Phi]$ correspond to a first out-of-phase bend mode, an in-phase lateral mode, an out-of-phase lateral mode, an out-of-phase twist mode and a second out-of-phase bend mode, respectively, for the conduit structure 10.

The modal transformation matrix $[\Phi]$ can be used to resolve the physical motion represented by the motion vector $\{x_{response}\}$ into real normal modal components. For example, Equation (2) may be explicitly solved for the modal motion vector $\{\eta\}$, by premultiplying both sides of Equation (2) by the inverse of the modal transformation matrix $[\Phi]$:

$$\{\eta\} = [\Phi]^{-1} \{x_{response}\}, \quad (4)$$

where, for the exemplary structure of FIG. 1, $$[\Phi]^{-1} = \begin{bmatrix} 0.0056 & 0.0498 & 0.0326 & 0.0135 & -0.0063 \\ -0.08 & 0.0002 & -0.1999 & 0.6436 & 0.2485 \\ -0.0035 & 0.0002 & -0.0916 & 0.3109 & -0.1591 \\ -0.418 & 0.0 & 0.0394 & 0.0044 & 0.0021 \\ 0.0391 & -0.0245 & 0.0223 & 0.0011 & 0.0019 \end{bmatrix} \left( \frac{lbf \cdot sec^2}{in} \right)^{\frac{1}{2}}. \quad (5)$$

As described in the aforementioned patent application "*Vibrating Conduit Parameter Sensors, Methods and Computer Program Products Utilizing Real Normal Modal Decomposition,*" the real normal modal motion $\{\eta\}$ may be used directly to estimate a process parameter associated with one or more of the real normal modes of the conduit structure, e.g., modes associated with Coriolis force. Alternatively, the modal transformation matrix $[\Phi]$ may be used to identify a "mode pass filter" that may be applied to the physical motion $\{x_{response}\}$ to produce a filtered physical domain response that preferentially includes components of the physical motion $\{x_{response}\}$ associated with one or more modes of the conduit. This filtered response may be used to estimate a process parameter.

A selective inverse real normal modal transformation matrix $[\Phi']$ can be used to translate a real normal modal motion vector $\{\eta\}$ to a filtered motion vector $\{x_{filtered}\}$ in which components associated with undesired real normal modes are attenuated:

$$\{x_{filtered}\} = [\Phi']\{\eta\}. \quad (6)$$

For the exemplary structure of FIG. 1, a selective inverse real normal modal transformation matrix $[\Phi']$ was constructed from the real normal modal transformation matrix $[\Phi]$ with by replacing those elements of the real normal modal transformation matrix $[\Phi]$ associated with the undesired real normal modes with zeroes:

$$[\Phi'] = \begin{bmatrix} 5.893 & 0 & 0 & -11.958 & 0 \\ 14.973 & 0 & 0 & -7.666 & 0 \\ 6.024 & 0 & 0 & 12.312 & 0 \\ 1.891 & 0 & 0 & 3.6 & 0 \\ 0.214 & 0 & 0 & 0.198 & 0 \end{bmatrix} \left( \frac{lbf \cdot sec^2}{in} \right)^{\frac{1}{2}}. \quad (7)$$

As shown in Equations (6) and (7), components of the conduit motion vector $\{x_{response}\}$ corresponding to undesired real normal modes may be attenuated by employing a selective inverse real normal modal transformation matrix $[\Phi']$ that corresponds to the real normal modal transformation matrix $[\Phi]$ with zeroes replacing those elements of the real normal modal transformation matrix $[\Phi]$ associated with the undesired real normal modes. Those skilled in the art will appreciate, however, that attenuation of these components could be achieved using nonzero values for these elements of the selective inverse real normal modal transformation matrix $[\Phi']$.

Combining Equations (4) and (6):

$$\{x_{filtered}\} = [\Phi'][\Phi]^{-1}\{x_{response}\} = [\Psi]\{x_{response}\}, \quad (8)$$

where the mode pass filter matrix $[\Psi]$ is given by $$[\Psi] = [\Phi'][\Phi]^{-1}. \quad (9)$$

The mode pass filter matrix $[\Psi]$ processes the conduit motion vector $\{x_{response}\}$ such that the filtered output motion vector $\{x_{filtered}\}$ preferentially represents components of the conduit motion vector $\{x_{response}\}$ associated with one or more desired modes. The mode pass filter matrix $[\Psi]$ may also be generated by:

$$[\Psi] = [\Phi][A][\Phi]^{-1}, \quad (10)$$

where $[A]$ is a "diagonal" matrix whose off-diagonal elements are zeros, with selected diagonal elements corresponding to desired modes set to one, e.g., $$[A] = \begin{bmatrix} 1 & 0 & \cdots & 0 \\ 0 & 0 & & 0 \\ \vdots & & \ddots & \vdots \\ 0 & \cdots & & 1 \end{bmatrix}. \quad (11)$$

The filtered output $\{x_{filtered}\}$ may be processed to generate accurate estimates of process parameters such as mass flow. For example, the filtered output $\{x_{filtered}\}$ may be processed according to conventional phase or time difference Coriolis measurement techniques, as described in the aforementioned patent application "*Vibrating Conduit Parameter Sensors, Methods and Computer Program Products Utilizing Real Normal Modal Decomposition.*" For the exemplary system illustrated in FIG. 1, this could be done by determining a phase difference or time difference between components of the filtered output $\{x_{filtered}\}$ corresponding to the right and left transducers 105A, 105B using, for example, zero crossing or similar phase or time difference techniques such as those described in U.S. Pat. No. RE31,450 to Smith, U.S. Pat. No. 4,879,911 to Zolock, and U.S. Pat. No. 5,231,884 to Zolock, or similar phase or time difference techniques implemented in a digital domain using a digital signal processor (DSP) or other computing device.

B. Residual Flexibility and Zero Offset

A Coriolis flowmeter is typically excited or "driven" to cause a fluid or other material in the conduit of the meter to undergo a Coriolis acceleration. This excitation typically is imparted at or near a resonant frequency of a vibrational mode of the sensor conduit structure; e.g., at the resonant frequency of a so-called "drive" or "excitation" mode. It is often assumed that a periodic excitation applied at the resonant frequency of a mode of the sensor conduit produces a unimodal response, i.e., a response limited to that drive or excitation mode. In reality, however, excitation typically produces motion in additional real normal modes beyond the drive or excitation mode. As described above, the off-resonance response of real normal modes other than the drive mode can contribute to residual flexibility at the drive mode frequency, and thus to measurement phenomena such as zero offset in phase or time difference measurements performed at the excitation frequency.

Figure 2:
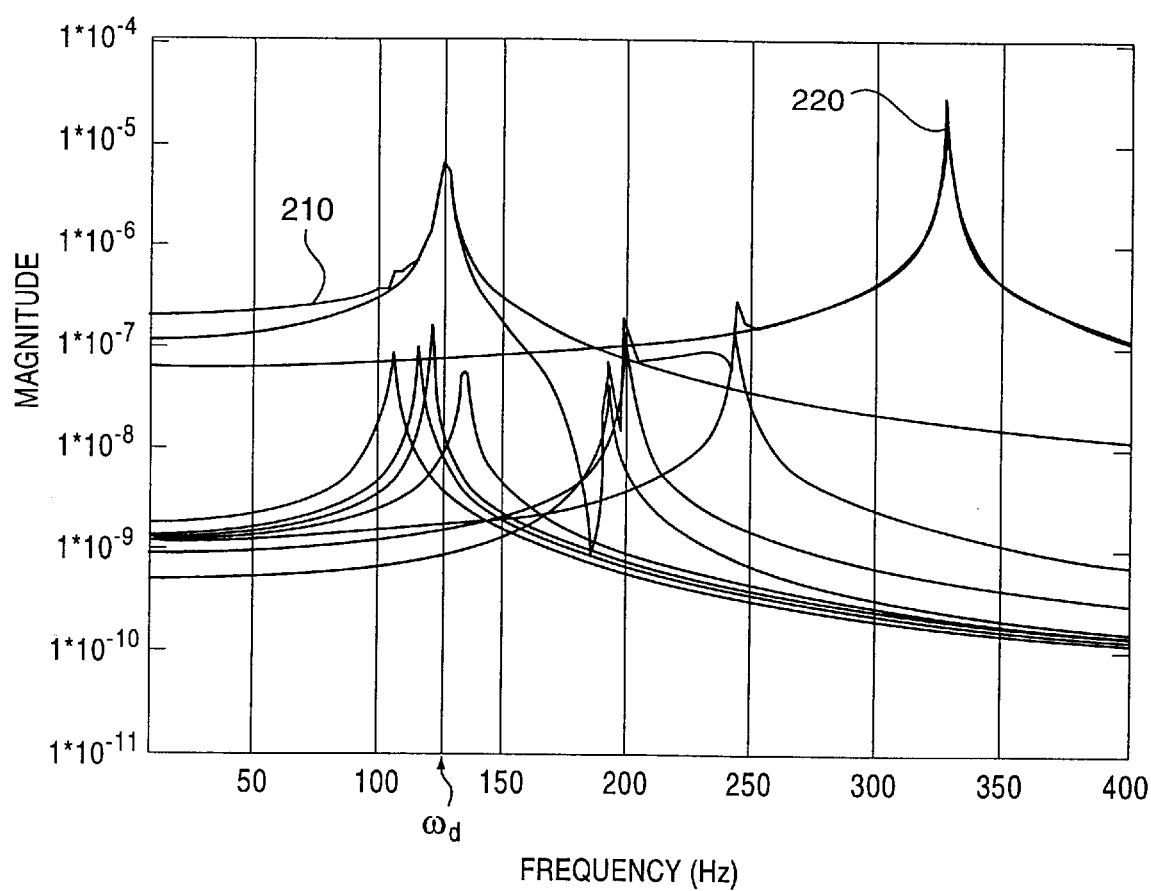
FIGS. 2–4 illustrate frequency responses of real normal modes of the exemplary conduit structure of FIG. 1.

For the experimentally-analyzed three-inch Coriolis flowmeter, nine modes having resonant frequencies between 0 and 400 Hz were identified. FIG. 2 illustrates the total physical response 210 of the sensor's left transducer, and the frequency responses of the first nine modes of the structure. As illustrated, there are many modes having a nonzero response at the excitation frequency $\omega_d$. The off-resonance responses of these modes contribute to residual flexibility at the excitation frequency $\omega_d$. Of particular interest is the prominent first out-of-phase twist mode 220 having a resonant frequency at approximately 325 Hz. For the experimentally-analyzed sensor, this mode represents one of a family of "flow modes" that are highly correlated with Coriolis acceleration of material within the sensor conduit. For the illustrated responses of FIG. 2, this twist mode contributes the greatest residual flexibility at the excitation frequency $\omega_d$.

Figure 3:
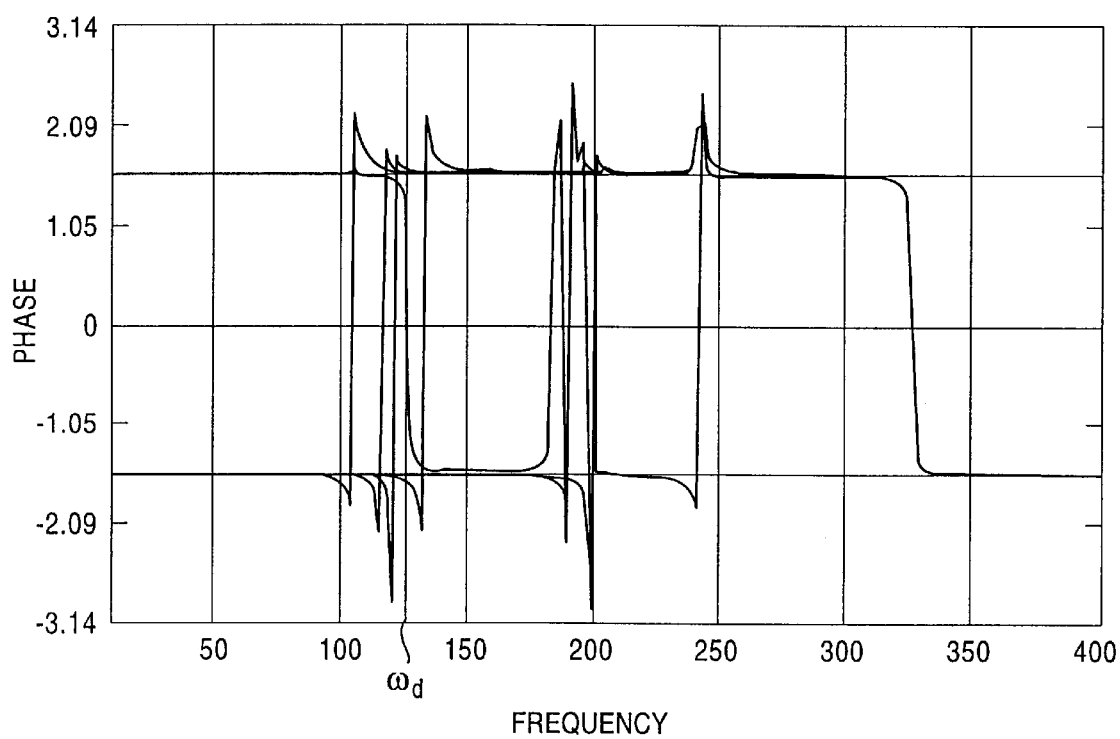
Figure 4:
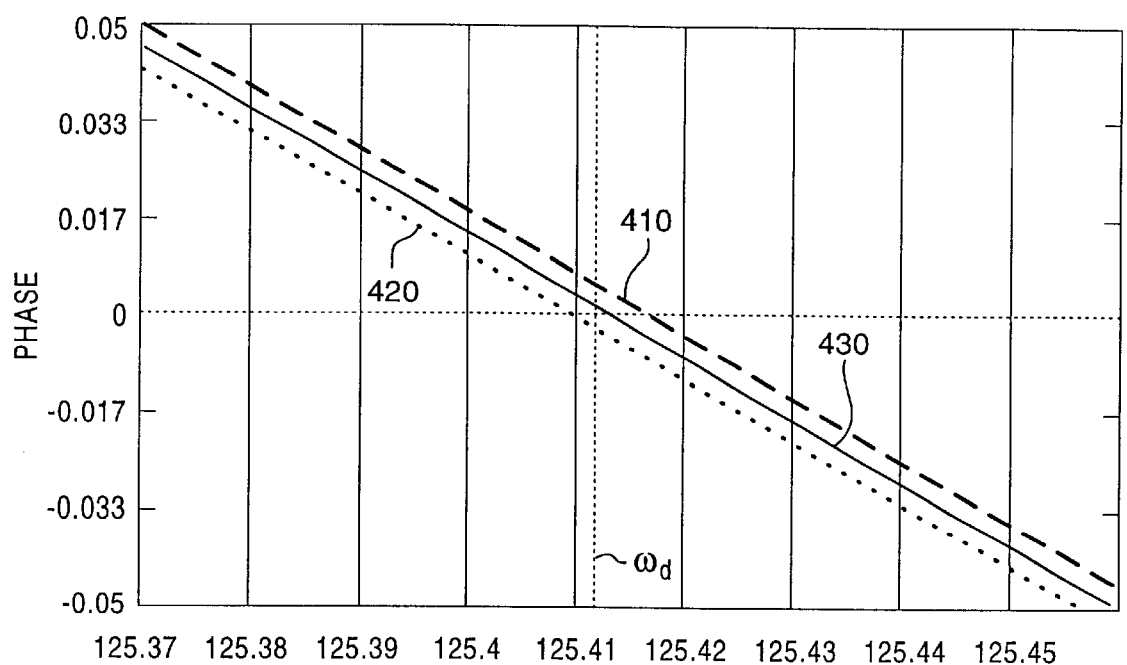

FIG. 3 illustrates phase responses corresponding to the magnitude responses of FIG. 2. Residual flexibility can affect the phase of the response, and thus can introduce bias or zero offset in phase or time difference measurements used to estimate mass flow. As illustrated in FIG. 4, which shows the phase responses of FIG. 3 magnified near the excitation frequency $\omega_d$, the difference 430 between phase 410 of the left motion transducer signal and the phase 420 of the right motion transducer signal exhibits a bias at zero flow, illustrating the potential effects of off-resonance contributions of modes other than the drive mode on phase difference measurements.

II. Determining Residual Flexibility by Real Normal Modal Decomposition

Analytically, the off-resonance contributions of real normal modes other than the drive mode at zero flow can be determined by identifying a portion of the conduit response at the excitation frequency that is attributable to these off-resonance contributions, i.e., by estimating a "real normal modal residual flexibility component" of conduit motion that contributes to residual flexibility. The estimated real normal modal residual flexibility component may then be used to generate a residual-flexibility-compensated estimate of mass flow according to a number of different techniques.

Figure 5:
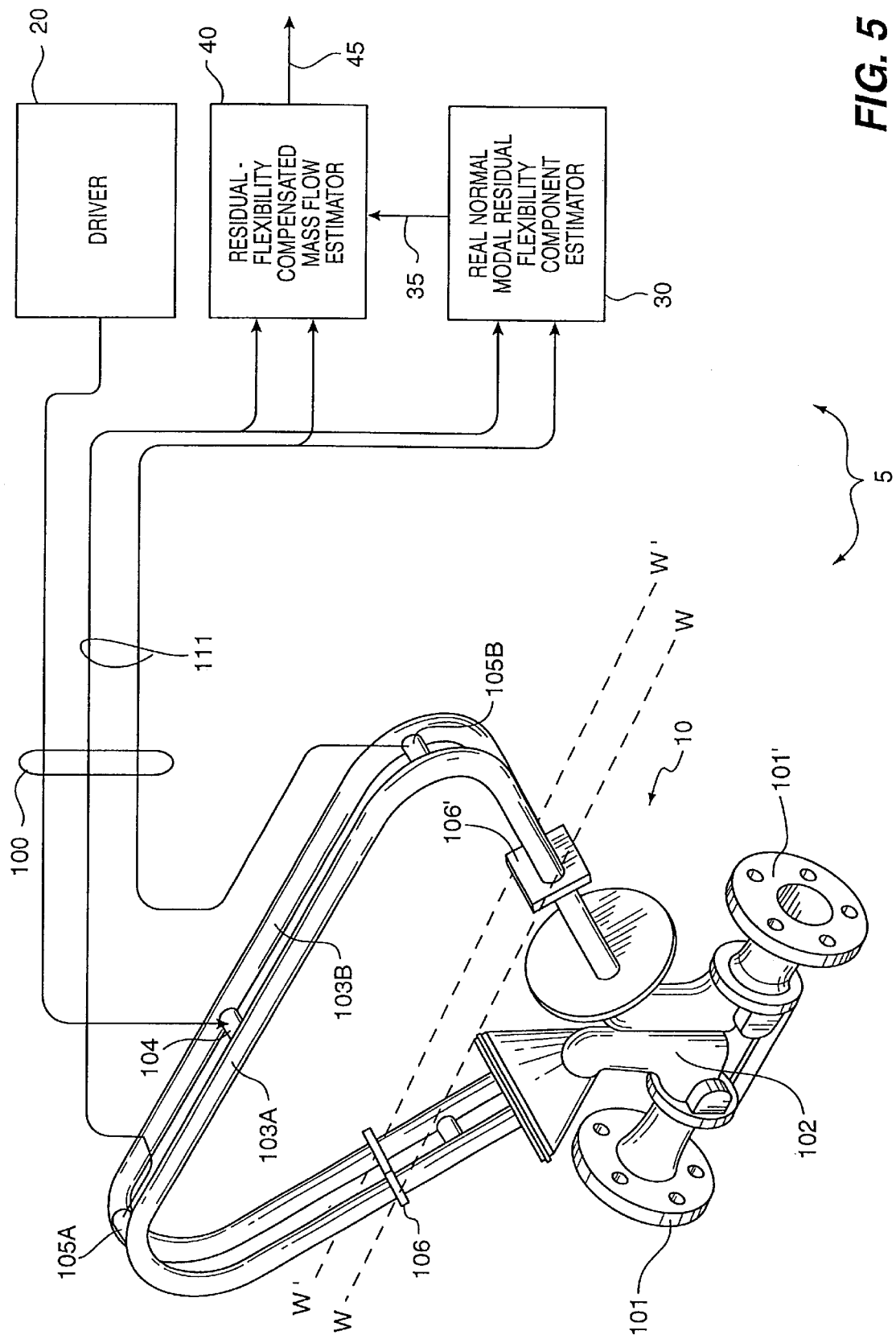
FIGS. 5–6 illustrates an embodiment of a vibrating conduit parameter sensor according to the present invention.

FIG. 5 illustrates an exemplary embodiment of a vibrating conduit parameter sensor 5 according to the present invention. The sensor 5 includes a conduit assembly 10. The conduit assembly 10 includes an inlet flange 101, an outlet flange 101', a manifold 102 and first and second conduits 103A, 103B. Brace bars 106, 106' connect the conduits 103A, 103B. Connected to the conduits 103A, 103B is an actuator 104 that is operative to vibrate the conduits 103A, 103B responsive to a driver 20. Motion transducers 105A, 105B are operative to produce a plurality of motion signals representing motion at a plurality of locations of the conduits 103A, 103B, e.g., signals representing displacement, velocity or acceleration of the conduits 103A, 103B. The motion transducers 105A, 105B may include a variety of devices, such as coil-type velocity transducers, optical or ultrasonic motion sensors, accelerometers, inertial rate sensors and the like. Leads 100 are connected to the actuator 104 and the motion transducers 105A, 105B.

When the conduit assembly 10 is inserted into a material processing system 1, material flowing in the material processing system 1 enters the conduit assembly 10 through the inlet flange 101. The material then flows through the manifold 102, where it is directed into the conduits 103A, 103B. After leaving the conduits 103A, 103B, the material flows back into the manifold 102 and exits the meter assembly 10 through the outlet flange 101'. As the material flows through the conduits 103A, 103B, it gives rise to Coriolis forces that perturb the conduits 103A, 103B.

The conduits 103A, 103B may be driven by the actuator 104 in opposite directions about their respective bending axes W—W and W'—W', inducing what is commonly referred to as a first out-of-phase bending mode in the conduit assembly 10. The actuator 104 may comprise any one of many well-known devices, such as linear actuator including a magnet mounted to the first conduit 103A and an opposing coil mounted to the second conduit 103B. An alternating current induced by a drive signal provided by a driver 20 via a drive lead 110 passes through the coil, generating mechanical force that vibrates the conduits 103A, 103B. The excitation supplied by the actuator 104 may be substantially coherent, e.g., confined to a narrow frequency range, or may be broadband.

Although the parameter sensor 5 illustrated in FIG. 5 is shown as including an integral actuator 104, those skilled in the art will appreciate that vibration of the conduits 103A, 103B according to the present invention may be achieved by other techniques. For example, broadband excitation may be generated external to the conduit assembly 10 by such sources as pumps or compressors and conveyed to the conduit assembly 10, for example, via one of the flanges 101, 101'. Similarly, broadband excitation may be generated by transfer of energy from a material in the conduits 103A, 103B through, for example, a fluid-structure interaction (FSI) mechanism.

The parameter sensor 5 includes a real normal modal residual flexibility component estimator 30 that is configured to receive motion signals from the motion transducers 105A, 105B over leads 111 and operative to estimate a real normal modal residual flexibility component 35 of motion of the conduits 103A–B. A residual-flexibility-compensated mass flow estimator 40 is responsive to the real normal modal residual flexibility component estimator 30, configured to receive motion signals from the motion transducers 105A, 105B, and operative to generate a residual-flexibility-compensated estimate 45 of mass flow from the motion signals and the estimated real normal modal residual flexibility component 35.

Figure 6:
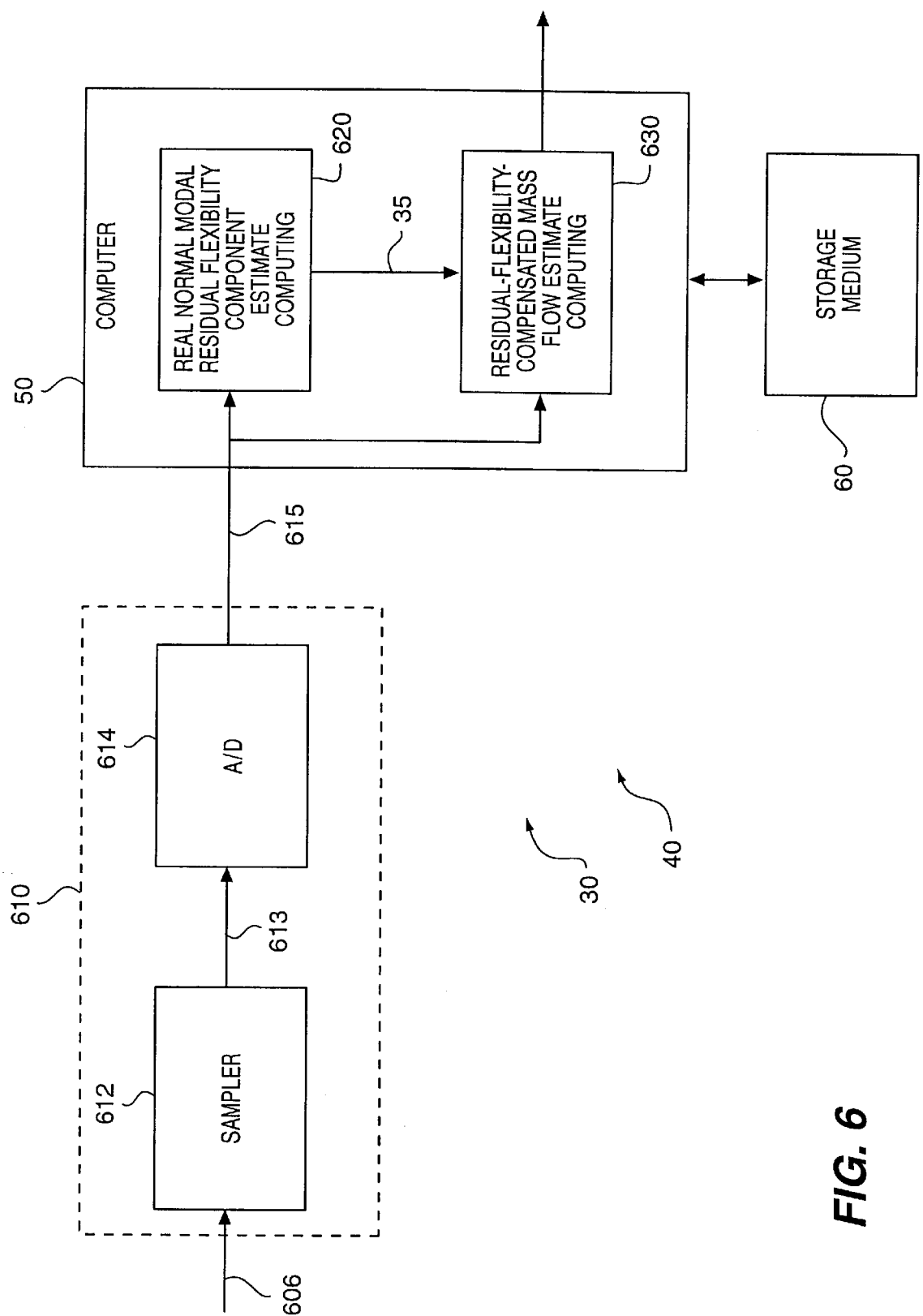

As illustrated in FIG. 6, the real normal modal residual flexibility component estimator 30 and the residual-flexibility-compensated mass flow estimator 40 may be implemented using a computer 50, e.g., a microprocessor, microcontroller, digital signal processor (DSP) or the like. In the illustrated embodiment of FIG. 6, both the real normal modal residual flexibility component estimator 30 and the residual-flexibility-compensated mass flow estimator 40 include means 610 for receiving motion signals 605, such as a sampler 612, for example, a sample-and-hold or similar circuit, that samples the motion signals 605 and produces samples 613 therefrom for subsequent conversion to digital signal values 615 by an analog-to-digital converter (A/D) 614. Operations of the sampler 612 and A/D 614 may be performed by a number of circuits known to those skilled in the art, and need not be discussed in greater detail herein. Those skilled in the art will appreciate that the motion signals 605 can be processed in a number of ways. For example, anti-alias filtering, post-sampling filtering and similar signal processing may be applied. It will also be understood that, in general, the receiving means 610 illustrated in FIG. 6 may be implemented using special purpose hardware, firmware or software running on special or general-purpose data processing devices or combinations thereof. For example, the sampling and analog to digital conversion functions may be integrated with the transducers 105A, 105B.

The computer 50 may comprise, for example, a pipelined DSP especially suited for linear algebraic computations, such as a DSP of the TMS320C4X family of DSPs sold by Texas Instruments, Inc. Configured with appropriate program code, e.g., software and/or firmware and data stored, for example, in a storage medium 60 such as a random access memory (RAM), electrically erasable programmable read-only memory (EEPROM), magnetic disk or the like, the computer 50 provides means 620 for computing an estimate of the residual real normal modal component 35 from the digital values 615, as well as means 630 for computing a residual-flexibility-compensated estimate 45 of mass flow from the digital values 615. It will be appreciated that other computing devices, such as microcontrollers, microprocessors, field-programmable gate arrays (FPGAs) and the like may be similarly used.

Figure 7:
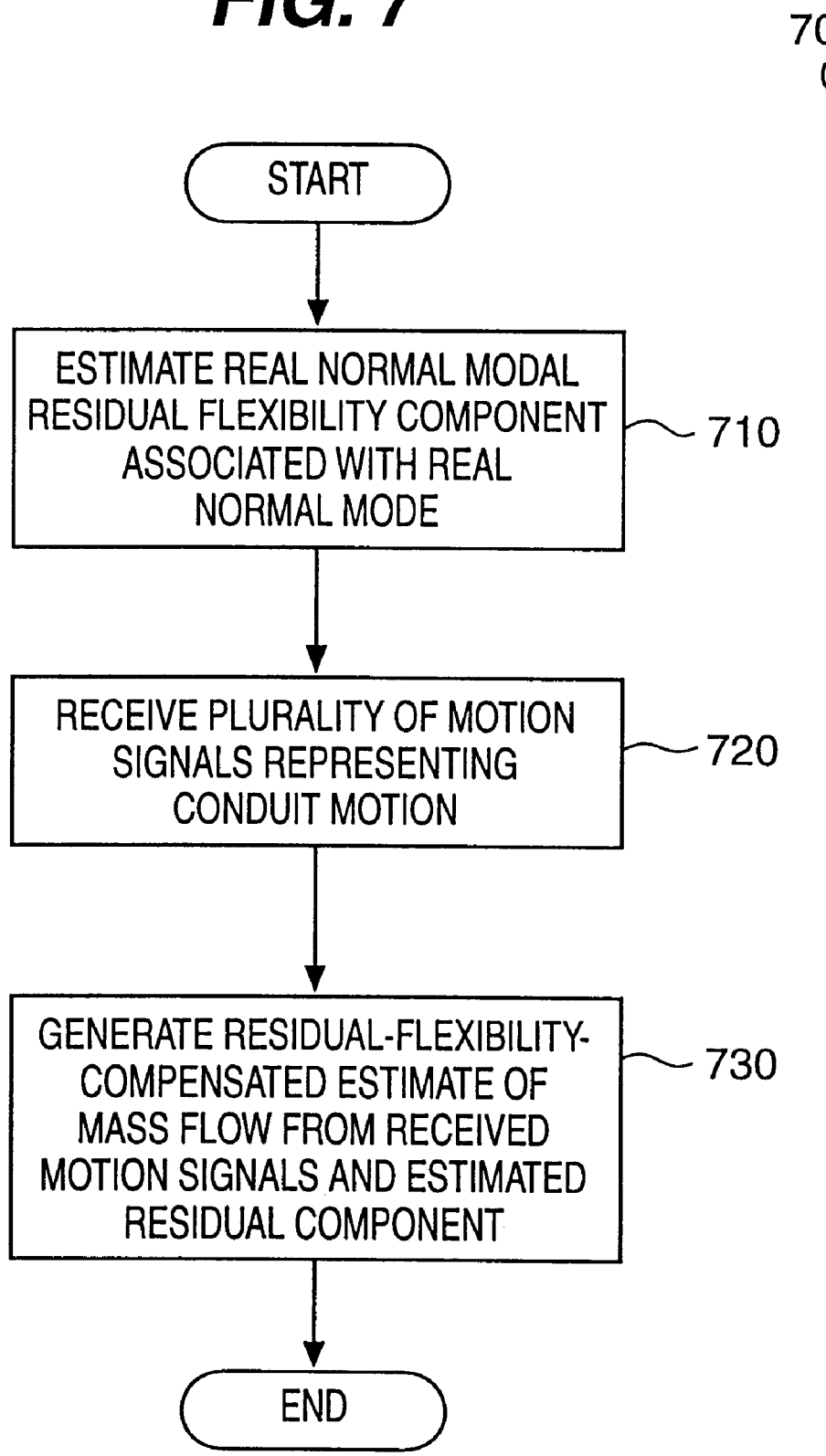

FIG. 7 illustrates operations 700 for estimating a process parameter from motion signals representing motion of a conduit containing a material. A real normal modal residual flexibility component associated with a real normal mode of motion of the conduit is estimated (Block 710). A plurality of motion signals is received representing motion of the sensor conduit as a material flows therethrough (Block 720). A residual-flexibility-compensated estimate of mass flow is then generated from the received plurality of motion signals and the estimated real normal modal residual flexibility component (Block 730).

The real normal modal residual flexibility component estimate and the residual-flexibility-compensated mass flow estimate can be generated in a number of ways. According to one aspect of the present invention, the real normal modal residual flexibility component is estimated from motion signals representing conduit motion under a substantially zero mass flow condition. According to a related "dynamic zeroing" aspect, a first real normal modal residual flexibility component associated with a flow-correlated real normal mode is estimated from motion signals representing conduit motion under a substantially zero mass flow condition, a second real normal modal residual flexibility component is estimated from motion signals representing conduit motion under a non-zero mass flow condition, and a residual-flexibility-compensated estimate of mass flow is generated from the first and second estimated real normal modal residual flexibility components. The second real normal modal residual flexibility component can be updated by measurements under non-zero flow conditions, allowing accurate residual-flexibility-compensated estimates to be generated without requiring the stopping of mass flow for recalibration of the sensor.

According to another aspect of the present invention, a real normal modal residual flexibility component can be estimated without requiring measurements under a no-flow condition. A frequency response function or "delta function" for a mode other than the drive mode, e.g., a function describing the frequency response of a flow-correlated twist mode, is identified using, for example, pole estimation techniques. Measurements are made of the actual frequency response for this mode at frequencies other than the excitation frequency, preferably at frequencies near the resonant frequency of the mode. The measured values are then fitted to the identified frequency response function to estimate scaling of the mode. The estimated mode scaling is then used to generate an estimate of the residual flexibility contribution of this mode at the excitation frequency. Because the mode scaling can be determined from conduit motion information under non-zero flow conditions, stoppage of flow is not required for sensor calibration.

The discussion herein describes various techniques for generating estimates of a real normal modal residual flexibility component and generating a residual-flexibility-compensated estimate of mass flow therefrom. This discussion is conducted with reference to the flowchart illustrations and schematic diagrams of FIGS. 5–16. It will be understood that, in general, blocks or combinations of blocks in the flowchart illustrations and schematic diagrams of FIGS. 5–16 can be implemented using computer readable program code, e.g., program instructions and/or data operated on in a computer or data processor such as the computer 50 illustrated in FIG. 6. As used herein, computer readable program code may include but is not limited to such things as operating system commands (e.g., object code), high level language instructions, and the like, as well as data which may be read, accessed or otherwise utilized in conjunction with such program instructions.

The program code may be loaded onto a computer or similar data processing apparatus including, but not limited to, a microprocessor, a microcontroller, a digital signal processor (DSP) or the like. The combination of the program code and computer may provide an apparatus that is operative to implement a function or functions specified in a block or blocks of the flowchart illustrations or schematic diagrams. Similarly, the program code may be loaded onto a computer or data processing device such that the program code and computer provide means for performing the function or functions specified in a block or blocks.

The program code may also be stored in a computer-readable storage medium such as a magnetic disk or tape, a bubble memory, a programmable memory device such as an electrically-erasable programmable read-only memory (EEPROM), or the like. The stored program code may direct a computer accessing the storage medium to function such that the program code stored in the storage medium forms an article of manufacture including program code means for implementing the function or functions specified in a flowchart or schematic diagram block or blocks. The program code may also be loaded onto a computer to cause a series of operational steps to be performed, thereby implementing a process such that the program code, in conjunction with the computer, provides steps for implementing the functions specified in a flowchart or schematic diagram block or blocks. Accordingly, blocks of the flowchart illustrations and schematic diagrams support apparatus operative to perform the specified functions, combinations of means for performing the specified functions, combinations of steps that perform the specified functions and computer readable program code means, embodied in a computer-readable storage medium, for performing the specified functions.

It will also be understood that, in general, each block of the flowchart illustrations and schematic diagrams, and combinations of blocks in the flowchart illustrations and schematic diagrams, can be implemented by special purpose hardware, software or firmware executing on a general purpose computer, or combinations thereof. For example, functions of the blocks of the flowchart illustrations and schematic diagrams may be implemented by an application specific integrated circuit (ASIC), programmable gate array or similar special purpose device, or by program instructions and data loaded on and executed by a microprocessor, microcontroller, DSP or other general-purpose computing device. Those skilled in the art will also appreciate that although reference is made to digital implementation using a microprocessor, microcontroller DSP or other computing device, functions of the flowchart illustrations and schematic diagrams may also be implemented using analog computing or processing elements, such as analog filters, analog arithmetic components and the like.

A. Estimating a Real Normal Modal Residual Flexibility Component using Drive Mode Filtering According to a first aspect of the present invention, residual conduit motion under a substantially zero mass flow condition associated with modes other than the drive mode at a frequency of interest, e.g., the excitation frequency of the sensor, is determined by filtering out that portion of the conduit motion attributable to the "drive" or "excitation" mode. The real normal modal residual flexibility component is then used to generate a residual-flexibility-compensated estimate of mass flow at unknown mass flow rates. The drive mode filtering may be accomplished in a modal coordinate domain or by mode pass filtering in a physical coordinate domain.

According to a first technique, a residual-flexibility-compensated mass flow estimate is generated using modal domain computations. Residual real normal modal motion under a substantially zero mass flow condition in at least one mode other than the drive mode is estimated. Motion signals representing motion of the sensor conduit under a subsequent unknown mass flow condition are then processed to estimate real normal modal motion of the conduit under the unknown mass flow condition. The residual real normal modal motion at the substantially zero mass flow condition is then subtracted from the estimated real normal modal motion at the unknown mass flow condition to generate a residual-flexibility-compensated estimate of real normal modal conduit motion at the unknown mass flow condition. The residual-flexibility-compensated estimate of conduit motion may then be used to generate a residual-flexibility-compensated estimate of mass flow using modal domain mass flow estimation techniques.

Figure 8:
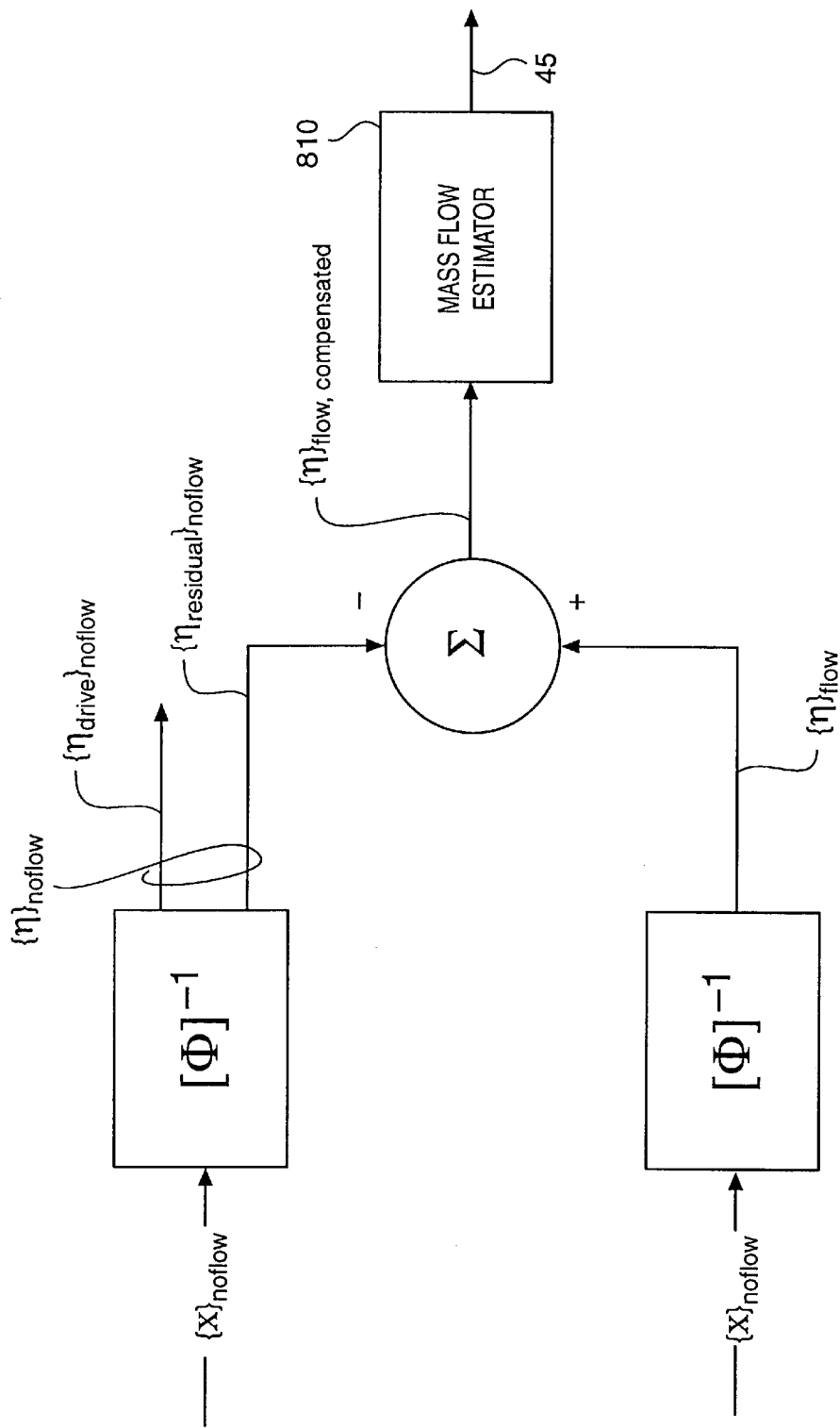

Referring to FIG. 8, real normal motion $\{\eta\}_{noflow}$ under a substantially zero mass flow condition may be estimated from a physical coordinate domain representation $\{x\}_{noflow}$ of the conduit motion under the substantially zero mass flow condition by using a modal filter $[\Phi]^{-1}$:

$$\{\eta\}_{noflow} = [\Phi]^{-1}\{x\}_{noflow},  \quad (12)$$

where $\{\eta\}_{noflow}$ represents the modal response under the substantially zero mass flow condition, and $\{x\}_{noflow}$ represents a physical quantity such as displacement, velocity or the like under the substantially zero mass flow condition represented, for example, by a motion signal received from a motion transducer operatively associated with the sensor conduit structure.

A real normal modal residual flexibility component $\{\eta_{residual}\}_{noflow}$ of the zero-flow modal response $\{\eta\}_{noflow}$ at the excitation frequency associated with modes other the the drive mode can be used to generate a residual-flexibility-compensated estimate of mass flow under an unknown mass flow condition by estimating the real normal modal motion $\{\eta\}_{flow}$ under the unknown mass flow condition from a physical domain representation $\{x\}_{flow}$ of conduit motion under the unknown mass flow condition, and subtracting the real normal modal residual flexibility component $\{\eta_{residual}\}_{noflow}$ to generate a residual-flexibility-compensated estimate $\{\eta\}_{flow,\ compensated}$ of conduit motion under the unknown mass flow condition:

$$\{\eta\}_{flow,compensated} = \{\eta\}_{flow} - \{\eta_{residual}\}_{noflow}. \quad (13)$$

The residual-flexibility-compensated estimate $\{\eta\}_{flow,\ compensated}$ of real normal modal motion under the nonzero mass flow condition may then be used to generate a residual-flexibility-compensated estimate of mass flow 45 using, for example, a mass flow estimator 810 that is operative to estimate mass flow directly from real normal modal motion in modal domain coordinates as described in the aforementioned patent application *"Vibrating Conduit Parameter Sensors, Methods and Computer Program Products Utilizing Real Normal Modal Decomposition."*

Figure 9:
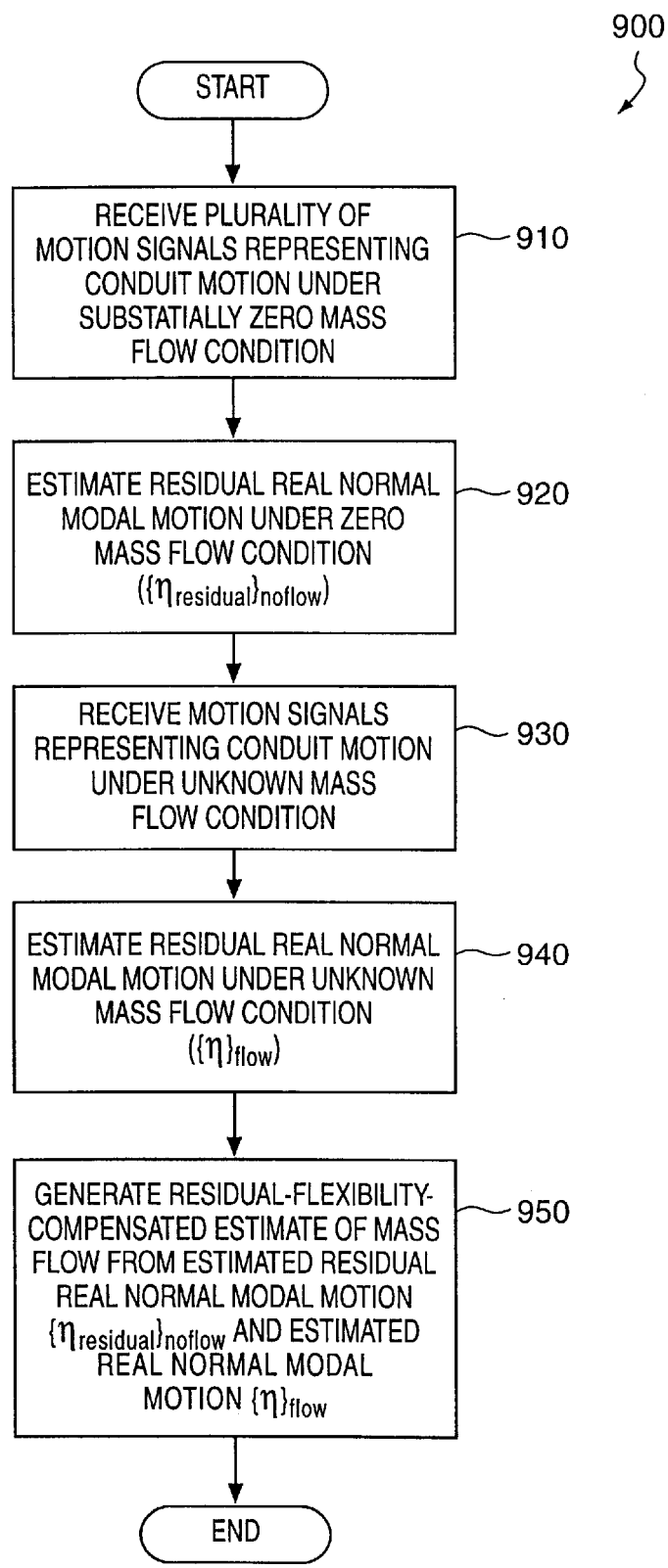

FIG. 9 illustrates exemplary operations 900 for generating a residual-flexibility-compensated mass flow estimate using modal domain computations. A plurality of motion signals representing conduit motion under a substantially zero mass flow condition is received (Block 910). Residual real normal modal motion under the substantially zero mass flow condition is estimated from the received motion signals (Block 920). Motion signals representing conduit motion under an unknown mass flow condition are then received (Block 930). Real normal modal motion under the unknown mass flow condition is estimated from the received motion signals (Block 940). A residual-flexibility-compensated estimate of mass flow is then generated from the estimated residual real normal modal motion and the estimated real normal modal motion under the unknown mass flow condition (Block 950).

According to an alternative technique, a residual-flexibility-compensated mass flow estimate is generated using mode pass filtering techniques in a physical coordinate domain. Motion $\{x\}$ of a sensor conduit may be viewed as the sum of physical motion $\{x_{drive}\}$ attributable to the drive mode and residual physical motion $\{x_{residual}\}$ attributable to other modes:

$$\{x\} = \{x_{drive}\} + \{x_{residual}\}. \quad (14)$$

Rearranging Equation (14), $$\{x_{residual}\} = \{x\} - \{x_{drive}\}. \quad (15)$$

A general form of a mode pass filter matrix $[\Psi]$, using an inverse approach, is:

$$[\Psi] = [\Phi][A][\Phi]^{-1}, \quad (16)$$

where $[A]$ is a diagonal matrix designed to pass selected modes as described above, $[\Phi]$ is a mode shape matrix with the columns corresponding to the mode shapes and the rows to the physical response locations, and $[\Phi]^{-1}$ is the generalized inverse of the modal matrix.

The portion of the physical conduit motion attributable to the drive mode may be described as:

$$\{x_{drive}\}=[\Psi]_{drive}\{x\}, \qquad (17)$$

where $[\Psi_{drive}]$ is a mode pass filter configured to pass only the drive or excitation mode. Substituting Equations (16) and (17) into Equation (15), and factoring yields:

$$\{x_{residual}\}=([I]-[\Psi]_{drive})\{x\}. \qquad (18)$$

Figure 10:
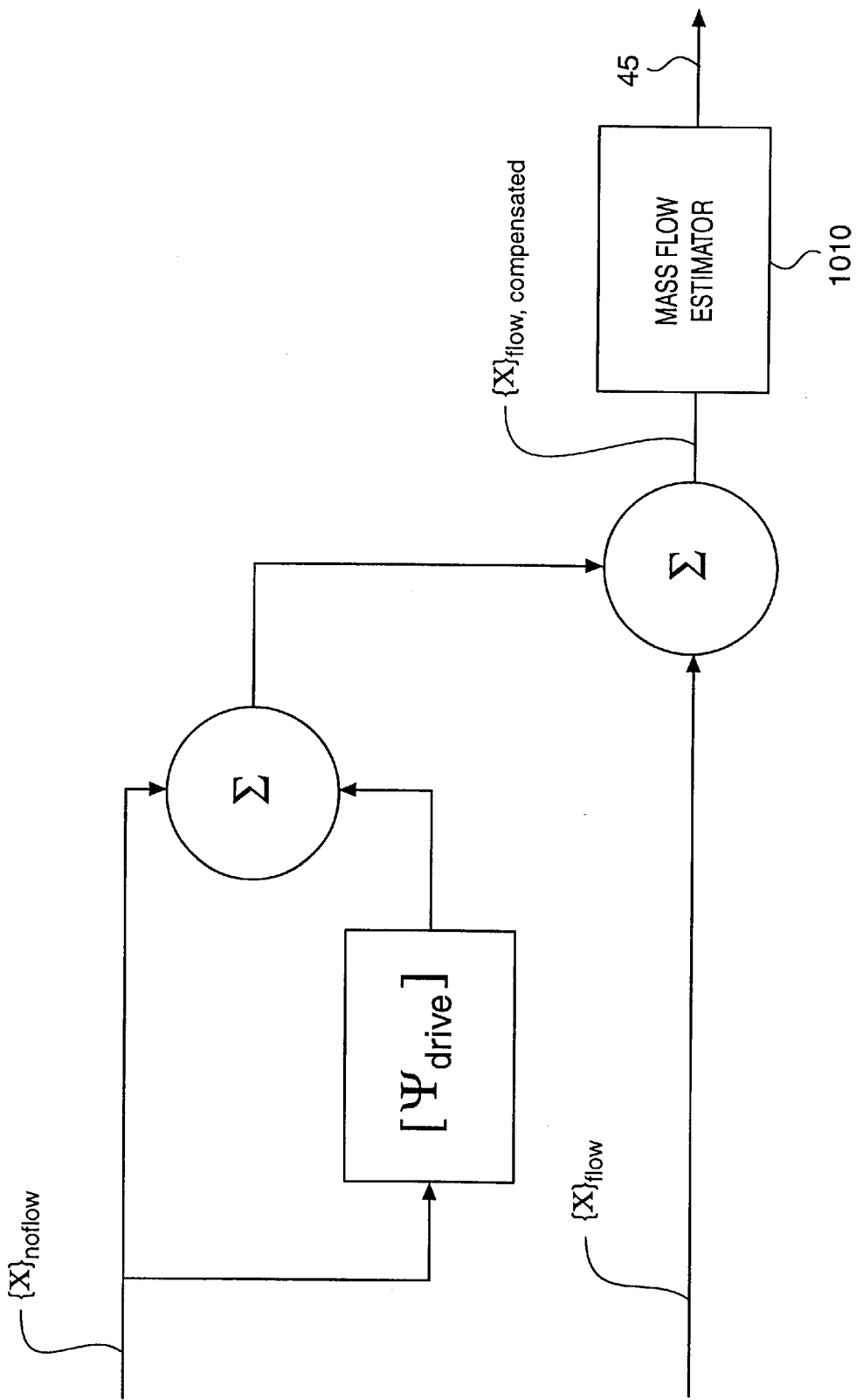

Referring to FIG. 10, a residual-flexibility-compensated estimate $\{x\}_{flow,compensated}$ of physical motion under an unknown flow condition may be estimated from a physical response $\{x\}_{flow}$ under the unknown flow condition and a physical response $\{x\}_{noflow}$ under a substantially zero mass flow condition by:

$$\{x\}_{flow,compensated}=\{x\}_{flow}-([I]-[\Psi_{drive}])\{x\}_{noflow}. \qquad (19)$$

Thus, the residual flexibility compensation process involves calculating a residual flexibility vector at substantially zero flow and subtracting this vector from the physical response $\{x\}_{flow}$ at an unknown flow. The residual-flexibility-compensated response $\{x\}_{flow,compensated}$, i.e., the response with the residual flexibility phase differences removed, can then be used to generate an estimate 45 of mass flow using, for example, a conventional mass estimator 1010 using phase measurement techniques as described in the aforementioned patent application "*Vibrating Conduit Parameter Sensors, Methods and Computer Program Products Utilizing Real Normal Modal Decomposition.*"

FIG. 11 illustrates exemplary operations for 1100 generating a residual-flexibility-compensated mass flow estimate according to this modal-filtering based technique. Motion signals representing conduit motion under a substantially zero mass flow condition are received (Block 1110). The received signals are mode pass filtered as described above to estimate residual physical motion under the substantially zero mass flow condition (Block 1120). Motion signals representing conduit motion under an unknown mass flow condition are then received (Block 1130). Physical motion under the unknown mass flow condition is determined (Block 1140) and a residual-flexibility-compensated mass flow estimate is generated from the estimated physical motion under the unknown mass flow condition and the estimated residual physical motion (Block 1150).

B. Dynamic Zeroing

According to another aspect of the present invention, two real normal modal residual flexibility components are estimated and used to generate a residual-flexibility-compensated mass flow estimate. A first real normal modal residual flexibility component is estimated from motion signals representing motion under a substantially zero mass flow condition, as described above. A second, "dynamic" real normal modal residual flexibility component is estimated under non-zero mass flow conditions, and thus can be periodically re-estimated as the sensor is used to update the sensor's zero offset calibration without requiring stoppage of flow. The first and second real normal modal residual flexibility components are used to generate a residual-flexibility-compensated estimate of mass flow.

This aspect of the present invention arises from the realization that real normal modes of a sensor conduit may be categorized as either "more flow-correlated" or "less flow-correlated." More flow-correlated modes are modes that have a response that is sensitive to flow through the sensor conduit, while less flow-correlated modes are, as might be expected, significantly less sensitive to flow rate. Less flow-correlated modes might include, for example, the lateral mode of the experimentally analyzed sensor described above.

More flow-correlated modes contribute to residual flexibility at substantially zero flow. In many cases, it is reasonable to assume that the residual flexibility associated with more flow-correlated modes is relatively time-invariant, meaning that zero drift probably is not caused by changes in the flow modes. Less flow-correlated modes, however, may be relatively insensitive to flow rate, but sensitive to changes in boundary conditions. Changes in boundary conditions can result in short or long term zero offset drift as these modes change. For example, changes in the boundary conditions may shift the lateral mode frequency for the above-described exemplary sensor, resulting in a change in this mode's contribution to the residual flexibility or zero offset.

By way of illustration, using experimental data for the three inch sensor described above, the modal (or "mode shape") matrix $[\Phi]$ for the sensor may be reduced to 3 columns, corresponding to a drive (out-of-phase bend) mode at 125 Hz, an in-phase lateral mode at 132 Hz, and an out-of-phase twist mode:

$$[\Phi] = \begin{bmatrix} 0.445 & 0.002 & -0.904 \\ 1.131 & 0.006 & -0.029 \\ 0.445 & -0.011 & 0.904 \\ 0.143 & 0.064 & 0.272 \\ 0.009 & 0.131 & 0.015 \end{bmatrix}$$

The rows of the modal matrix $[\Phi]$ correspond to the right, drive, and left transducer locations and the later skewed and lateral accelerometers as described above.

The modal matrix $[\Phi]$, mode scale factors $Q_r$ and poles $\lambda_r$ for N real normal modes r may be used to determined the frequency response function matrix $[H]$:

$$H(j\omega) = \sum_{r=1}^{N}\left[\frac{\Phi_r \cdot Q_r \cdot \Phi_r^T}{j\omega + \lambda_r} + \frac{\Phi_r \cdot Q_r^* \cdot \Phi_r^T}{j\omega - \lambda_r^*}\right]. \qquad (20)$$

The response vector $\{x\}$ may be calculated from the frequency response function $[H]$ and the drive force $\{F\}$, recalling that:

$$\{x\}=[H]\{F\}. \qquad (21)$$

Figure 12A:
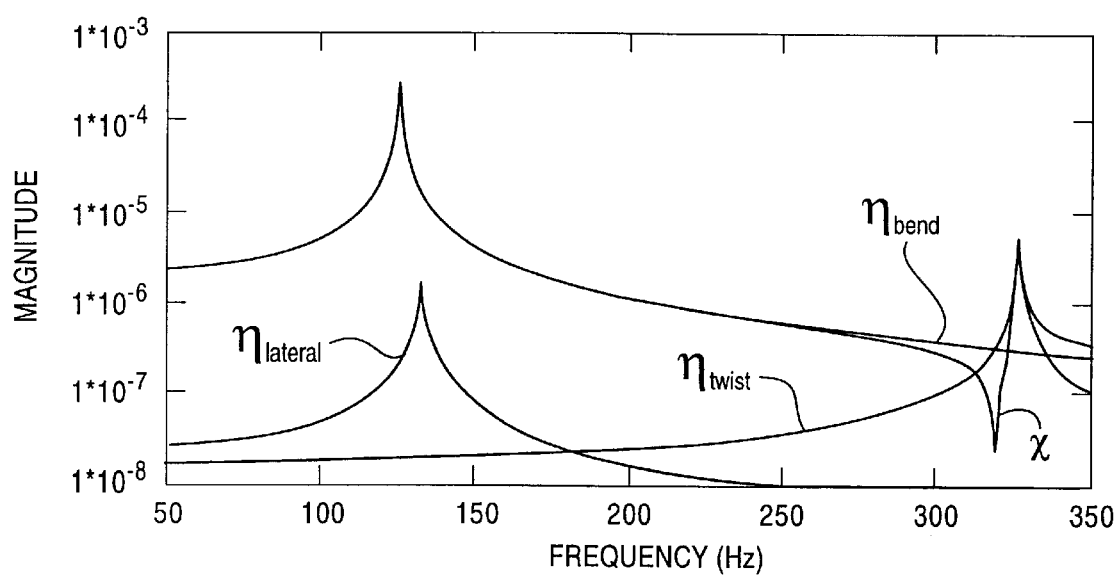
FIGS. 12A–B illustrate frequency responses of modes of an exemplary sensor conduit structure.
Figure 12B:
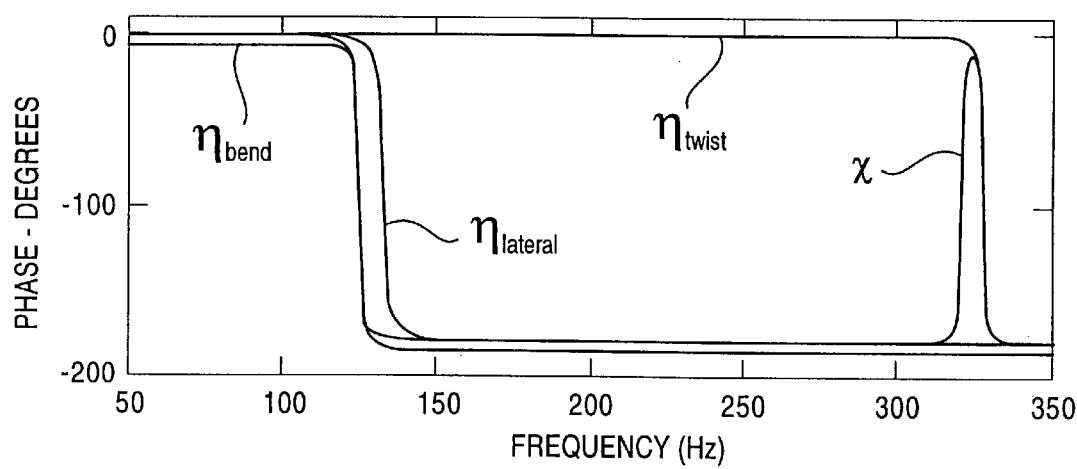

The modal responses for the three modes can be extracted with the modal filter constructed from the mode shape matrix $[\Phi]$ using, for example, an inverse method. FIGS. 12A–B show magnitude and phase, respectively, for a physical response x and modal responses $\eta_{bend}$, $\eta_{twist}$, $\eta_{lateral}$ as a function of frequency for the exemplary system.

The time delay caused by the residual flexibility of a physical response can be calculated by calculating the phase angle between motion signals produced by the right and left transducers and dividing by the excitation frequency $\omega_d$ to determine a time difference $\Delta t$. For the data given in FIGS. 12A–B:

$$\Delta t = \frac{\angle(x_1) - \angle(x_3)}{\omega_d} = 146 \text{ nsec.}$$

Two different mode pass filters can be defined, including a first mode pass filter that passes the bend and lateral modes to produce a physical response vector $\{x\}_{bl}$, and a second mode pass filter that passes the bend and twist mode to produce a physical response vector $\{x\}_{bt}$:

$$\{x_{bl}(\omega_d)\} = [\Phi]\begin{bmatrix} 1 & 0 & 0 \\ 0 & 1 & 0 \\ 0 & 0 & 0 \end{bmatrix} \cdot \{\eta(\omega_d)\}, \text{ and}$$

$$\{x_{bt}(\omega_d)\} = [\Phi]\begin{bmatrix} 1 & 0 & 0 \\ 0 & 0 & 0 \\ 0 & 0 & 1 \end{bmatrix} \cdot \{\eta(\omega_d)\},$$

where $\{x_{bl}(\omega_d)\}$, $\{x_{bt}(\omega_d)\}$, and $\{\eta(\omega_d)\}$ are the combined bend and lateral mode physical response vector, the combined bend and twist mode physical response vector, and the modal response vector, respectively, all evaluated at the excitation frequency $\omega_d$.

Calculating the zero offset contribution of each of the mode pass filtered components $\{x_{bl}(\omega_d)\}$, $\{x_{bt}(\omega_d)\}$ at zero flow for the experimentally-analyzed sensor:

$$\Delta t_{bl} = \frac{\angle(x_{bl_1}) - \angle(x_{bl_3})}{\omega_d} = 11 \text{ nsec, and}$$

$$\Delta t_{bt} = \frac{\angle(x_{bt_1}) - \angle(x_{bt_3})}{\omega_d} = 135 \text{ nsec,}$$

i.e., the lateral mode response is associated with 11 nanoseconds of zero offset and the twist mode response is associated with 135 nanoseconds of zero offset.

The flow-correlated twist mode response is generally confounded with flow, so it may be difficult to determine the zero offset due to this mode under flowing conditions. However, the flow-correlated twist mode is generally decoupled from the boundary conditions and can be considered time-invariant. The less flow-correlated lateral mode component can be assumed to be insensitive to flow rate, but can vary considerably with boundary conditions.

For example, if the resonant frequency of the lateral mode decreases by 4 Hz due to changes in boundary conditions, the individual modal contributions to zero offset become:

$$\Delta t_{bl} = \frac{\angle(x_{bl_1}) - \angle(x_{bl_3})}{\omega_d} = 23 \text{ nsec, and}$$

$$\Delta t_{bt} = \frac{\angle(x_{bt_1}) - \angle(x_{bt_3})}{\omega_d} = 135 \text{ nsec.}$$

The total zero offset using the contribution from this new lateral mode frequency is thus 158 nanoseconds, a change attributable to the change in the resonant frequency of the lateral mode. The zero offset $\Delta t_{bt}$ associated with the twist mode response is unchanged at 135 nanoseconds, since the lateral mode frequency shift does not affect the twist mode.

From these observations it becomes apparent that changes in a less flow-correlated mode can be tracked to monitor changes in the boundary conditions. The changes in the less flow-correlated mode can be monitored under non-zero flow conditions, thus allowing compensation for residual flexibility to be dynamically updated without requiring a stoppage of flow.

Figure 13:
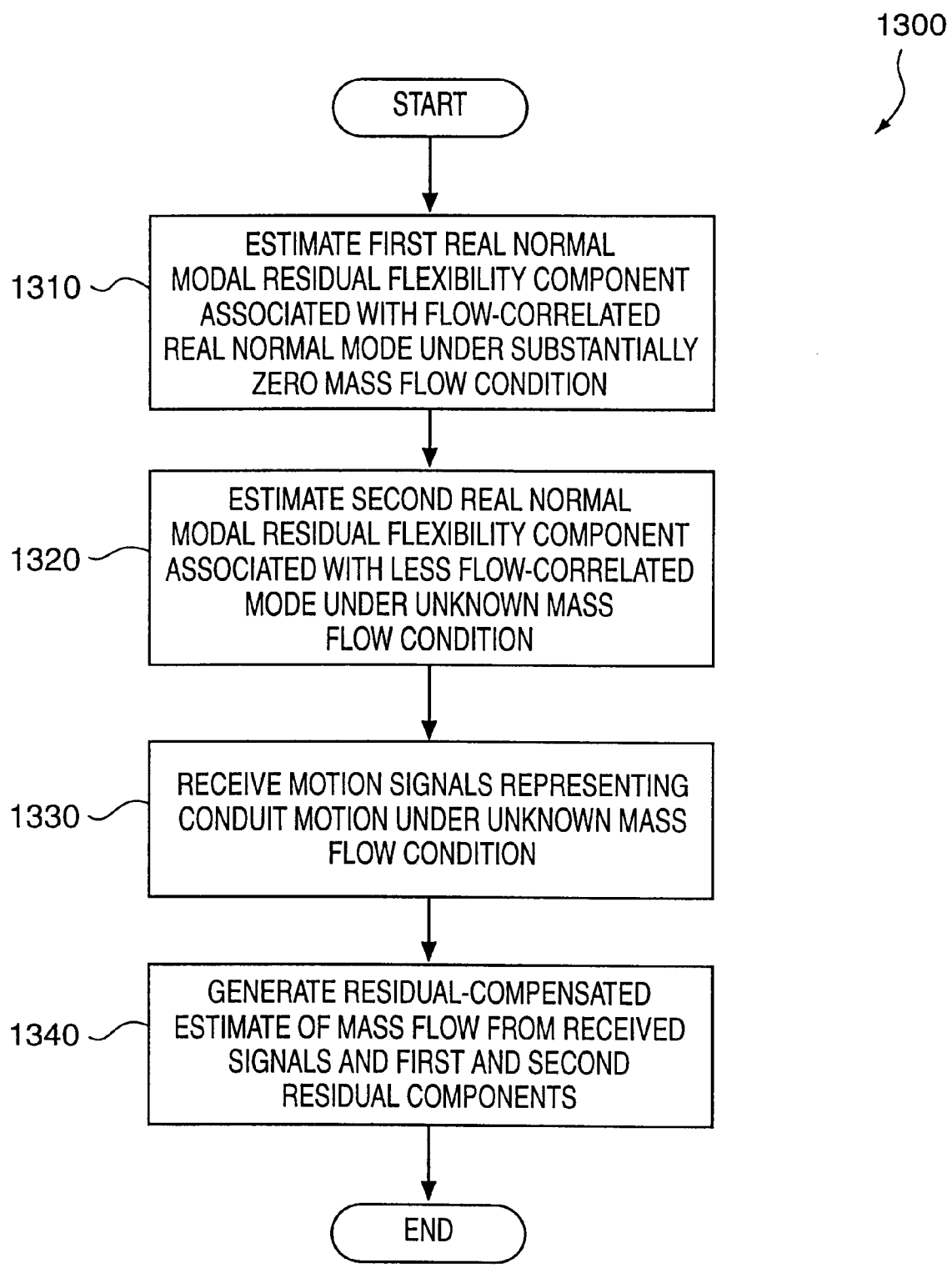
FIGS. 13–16 are flowchart illustrations and schematic diagrams illustrating operations for generating residual-flexibility-compensated estimates of mass flow according to aspects of the present invention.

FIG. 13 illustrates exemplary operations 1300 for generating residual-flexibility-compensated estimates of mass flow according to a dynamic zeroing technique. A first real normal modal residual flexibility component associated with a more flow-correlated real normal mode, e.g., the twist mode of the sensor described above, is estimated for a substantially zero mass flow condition (Block 1310). A second real normal modal residual flexibility component associated with a less flow-correlated mode, e.g., the lateral mode of the sensor described above, is then estimated under a non-zero mass flow condition (Block 1320). Motion signals representing conduit motion are then received (Block 1330), and a residual-flexibility-compensated estimate of mass flow is estimated therefrom using the first and second real normal modal residual flexibility components (Block 1340). Subsequently, the second real normal modal residual flexibility component is updated (Block 1320), additional motion signals are received (Block 1330) and a new residual-flexibility-compensated estimate of mass flow is generated from the received motion signals using the updated second real normal modal residual flexibility component (Block 1340). It will be understood that the estimation processes indicated in FIG. 13 may be performed in either the modal or physical domain, using the techniques and apparatus described above in reference to FIGS. 5–11.

The modal response of a particular real normal mode, e.g., the lateral mode described above, can also be calculated from an estimate of the pole for the desired mode using a predetermined frequency response function for the mode instead of by measurement of actual conduit motion. For example, instead of measuring the modal response for the lateral mode, an estimate of the modal response of the lateral mode could be computed using Equations (20) and (21) for a known force $\{F\}$ by setting r=2.

C. Estimating Real Normal Residual Motion by Estimating Mode Shape Scaling

According to another aspect of the presenting invention, residual flexibility associated with a real normal mode at a given frequency, for example, an excitation frequency at which phase or time difference measurements are performed, is estimated from measured motion in the real normal mode at frequencies other than the given frequency. For example, real normal modal motion may be measured at frequencies near the excitation frequency, and the measured motion used to interpolate the residual flexibility at the excitation frequency. According to the present invention, various linear, polynomial or other interpolation techniques may be used to generate an estimate of real normal modal motion at the excitation frequency from measured real normal modal motion at frequencies other than the excitation frequency.

According to one aspect of the present invention, a least squares technique is used to fit measured data representing motion in a real normal mode to an assumed frequency response or "delta" function using measurements at frequencies at which the response is more easily measured. A frequency response or "delta" function $\Delta_r$ for a single degree of freedom for a mode r of interest generally takes the form:

$$\Delta_r(\omega) = \frac{\eta_r}{N_r} = \kappa_r \left( \frac{-j}{j\omega - \lambda_r} + \frac{(-j)^*}{j\omega - \lambda_r^*} \right), \quad (22)$$

where $\lambda_r$ is the eigenvalue of the mode r, $\eta_r$ represents motion in the mode r, $N_r$ is the modal excitation in the mode r, $\kappa_r$ is a scalar that scales the modal response $\Delta_r$, and * indicates a complex conjugate. An eigenvalue $\lambda_r$ can be assumed or estimated from measurements. For example, an eigenvalue $\lambda_r$ may be estimated using a number of well known pole estimation techniques, such as those described in "Modal Testing: Theory and Practice," by D. J. Ewing, published by John Wiley and Sons, Inc. (1984).

An eigenvalue $\lambda_r$ is a complex number having a real part representing the damping of the mode r and the imaginary part representing the damped natural frequency $\omega_{mr}$ of the mode r. A mode's damping may be difficult to measure, but for a typical Coriolis mass flowmeter, damping can be assumed to be low. Assuming negligible damping:

$$\Delta_r(\omega) = \frac{\eta_r}{N_r} = \kappa_r \left( \frac{-j}{j\omega - j\omega_{mr}} + \frac{(-j)^*}{j\omega + j\omega_{mr}} \right). \quad (23)$$

As described above, the response of flow-correlated modes such as the twist mode of the exemplary sensor of FIG. 1 generally is confounded with flow, which can make it difficult to measure residual flexibility associated with such a mode near the excitation frequency under a non-zero flow condition. However, letting $\{\Delta_r\}$ represent a vector of delta functions corresponding to highly flow-correlated real normal modes, a least squares technique can be used to calculate a "scaling matrix" $[\kappa]$ that relates measured motion in the flow-correlated modes at frequencies removed from the excitation frequency to the vector $\{\Delta_r\}$ of delta functions. The scaling matrix $[\kappa]$ can then be used to generate an accurate estimate of residual flexibility at the excitation frequency that is attributable to the flow-correlated modes by applying the scaling transformation $[\kappa]$ to the vector $\{\Delta_r\}$ of delta functions.

In particular, the conduit structure is excited at one or more selected frequencies $\omega_s$ under a non-zero flow condition. Although the selected frequencies $\omega_s$ can be arbitrarily chosen, the further away from the excitation (drive) frequency $\omega_d$, generally the less the modal response of the flow-correlated modes is distorted by mass flow through the conduit. Preferably, the selected frequencies $\omega_s$ used to estimate a mode r are chosen near the resonant frequency $\omega_{mr}$ of the mode r.

A physical force $\{F\}$, known, for example, by either direct measurement or by inference from a parameter such as drive current, is applied at a selected frequency $\omega_s$. The physical force $\{F\}$ may be transformed to a modal excitation $\{N\}$ by:

$$\{N\} = [\Phi]^T \{F\}. \quad (24)$$

A physical response $\{x\}$ to the force $\{F\}$ can be transformed into a modal response $\{\eta\}$ by:

$$\{\eta\} = [\Phi]^{-1} \{x\}. \quad (25)$$

For a matrix of modal responses $$\left[ \frac{\eta_r(\omega_s)}{N_r} \right]_{flow}$$

for modes r obtained at a plurality of selected frequencies $[\omega_s]$, it is assumed that:

$$\left[ \frac{\eta_r(\omega_s)}{N_r(\omega_s)} \right]_{flow} = [\kappa][\Delta(\lambda_r, \omega_s)], \quad (26)$$

where $[\Delta(\lambda_r, \omega_s)]$ represents a matrix generated by evaluating the vector $\{\Delta_r\}$ of delta functions for the modes r at the plurality of selected frequencies $\omega_s$. Solving Equation (26) for the scaling matrix:

$$[\kappa] = \left[ \frac{\eta_r(\omega_s)}{N} \right]_{flow} [\Delta(\lambda_r, \omega_s)]^\dagger, \quad (27)$$

where $\dagger$ indicates a pseudo-inverse.

Accordingly, the modal response $$\left[ \frac{\eta_r(\omega)}{N_r(\omega)} \right]_{noflow}$$

at a frequency $\omega$ under zero flow, i.e., the motion associated with the flow-correlated modes at the frequency $\omega$, can be estimated (in modal domain coordinates) by:

$$\left[ \frac{\eta_r(\omega)}{N_r(\omega)} \right] \cong [\kappa]\{\Delta_r(\lambda_r, \omega)\} \quad (28)$$

$$= \left[ \frac{\eta_r(\omega_s)}{N_r(\omega_s)} \right]_{flow} [\Delta_r(\lambda_r, \omega_s)]^+ \{\Delta, (\lambda_r, \omega)\}.$$

Normally, it is desired to estimate residual flexibility associated with the flow-correlated modes at an excitation frequency $\omega_d$, which can be achieved by estimated by setting $\omega = \omega_d$ in Equation (28).

As described above, residual flexibility for a flow-correlated mode, i.e., the twist mode, is determined. However, it will be appreciated that the above-described techniques are also applicable to less flow-correlated modes. For example, residual flexibility associated with a negligibly flow-correlated lateral mode such as that described for the exemplary sensor of FIG. 1 could similarly be estimated from a delta function describing the frequency response of the lateral mode.

An estimate of residual-flexibility-compensated real normal modal motion at a given frequency, i.e., real normal modal motion compensated for residual flexibility associated with undesirable modes, can be produced by measuring real normal modal motion $\{\eta\}_{flow}$ at the given frequency and subtracting the residual real normal modal motion $\{\eta_r\}_{noflow}$ associated with the undesired modes. Assuming a constant modal excitation $\{N\}$, the residual-flexibility-compensated real normal modal motion $\{\eta\}_{flow,compensated}$ is given by:

$$\{\eta\}_{flow,compensated} = \{\eta\}_{flow} - \{\eta_r\}_{noflow}. \quad (29)$$

The compensated real normal modal motion may then be used to generate a residual-flexibility-compensated estimate of mass flow at the unknown flow rate, in a manner similar to that described above.

In some applications, however, it may be more convenient to determine residual flexibility in physical coordinates. Transforming from the modal coordinate domain to the physical coordinate domain, a residual-flexibility-compensated estimate of conduit motion in the physical domain is given by:

$$\{x(\omega)\}_{flow,compensated} = [\Phi]\{\eta(\omega)\}_{flow,compensated}. \quad (30)$$

To compensate for a residual flexibility associated with a flow-correlated mode, for example:

$$\{x(\omega)\}_{flow,compensated} = [\Phi][A_{drive}][\Phi]^{-1}\{x(\omega)\}_{flow} + [\Phi][A_{flowmode}][\Phi]^{-1}\{x(\omega)\}_{flow} -$$
$$[\Phi][A_{flowmode}][\Phi]^{-1}[x(\omega_s)][\Delta_r(\lambda_r,\omega_s)]^+\{\Delta_r(\lambda_r,\omega)\}, \quad (31)$$

where $[A_{drive}]$ and $[A_{flowmode}]$ are diagonal matrices designed to pass drive and flow-correlated modes, respectively. Restating Equation (31) in terms of mode pass filters $[\Psi_{drive}]$ and $[\Psi_{flowmode}]$ for the drive and flow-correlated modes, respectively:

$$\{x(\omega)\}_{flow,compensated} = [\Psi_{drive}]\{x(\omega)\}_{flow} + [\Psi_{flowmode}]\{x(\omega)\}_{flow} -$$
$$[\Psi_{flowmode}][x(\omega_s)][\Delta_r(\lambda_r,\omega_s)]^+\{\Delta_r(\lambda_r,\omega)\}. \quad (32)$$

Figure 14:
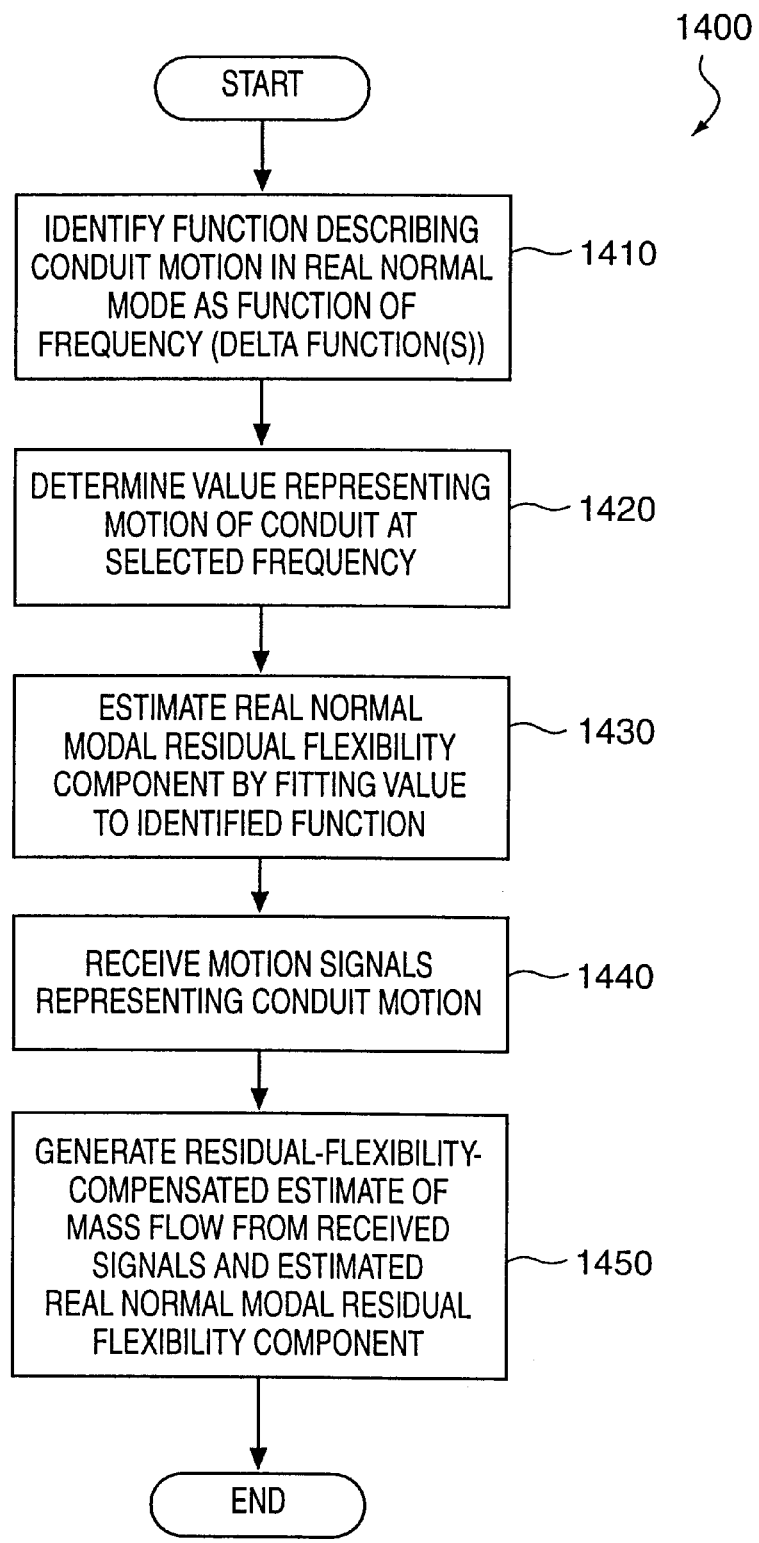

FIG. 14 illustrates exemplary operations 1400 for generating a residual-flexibility-compensated estimate of mass flow. A function is identified that describes motion of the sensor conduit in a real normal mode as a function of frequency (Block 1410). A value representing motion of the conduit at a selected frequency, e.g., a frequency near the resonant frequency of the real normal mode, is determined (Block 1420). For example, motion signals representing motion of the sensor conduit under a non-zero flow condition could be received and motion in the real normal mode could be determined therefrom at a plurality of selected frequencies near the resonant frequency of the real normal mode. A real normal modal residual flexibility component associated with the real normal mode is then estimated (Block 1430) using, for example, the least squares techniques described above. A plurality of motion signals representing conduit motion at an unknown mass flow rate is then received (Block 1440), and a residual-flexibility-compensated estimate of mass flow is generated from the received motion signals and the estimated real normal modal residual flexibility component (Block 1450).

Figure 15:
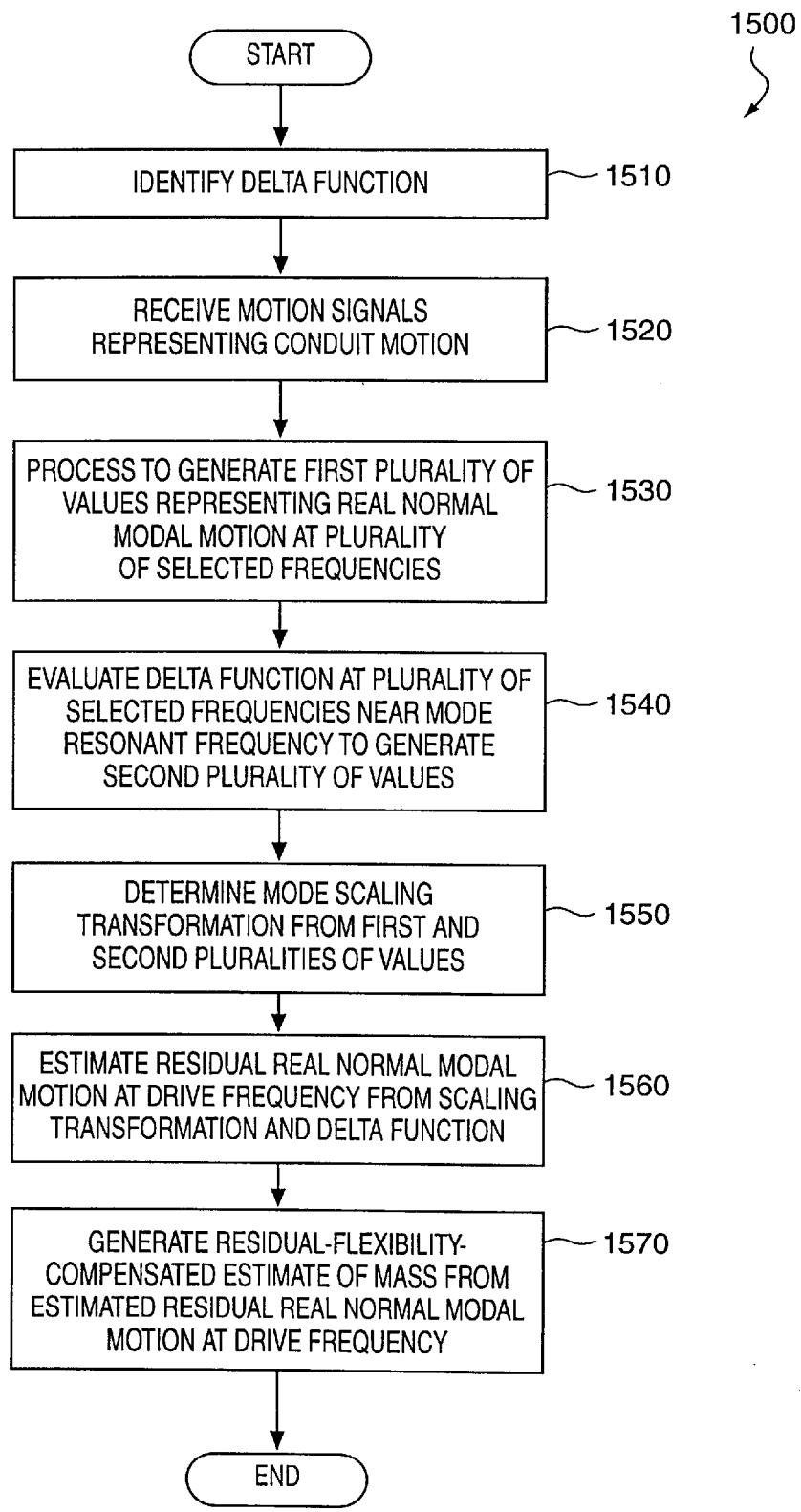

FIG. 15 illustrates operations 1500 for estimating residual real normal modal motion for use in generating a residual-flexibility-compensated estimate of mass flow in a modal coordinate domain. A delta function describing motion in a real normal mode is identified (Block 1510). Motion signals representing conduit motion are received (Block 1520). The received motion signals are processed to generate a first plurality of values representing the conduit motion at a plurality of selected frequencies (Block 1530). For example, the first plurality of values may describe motion in a flow-correlated mode at a plurality of selected frequencies near the resonant frequency of the mode. The identified delta function is evaluated at the plurality of selected frequencies to generate a second plurality of values (Block 1540). A mode scaling transformation is then determined from the first and second pluralities of values, e.g., using Equation (27) (Block 1550). Residual real normal modal motion at a frequency of interest, e.g., the excitation frequency, may then be determined from the scaling transformation and the delta function (Block 1560), and used to generate a residual-flexibility-compensated estimate of mass flow (Block 1570) using, for example, the techniques described with respect to FIG. 9.

Figure 16:
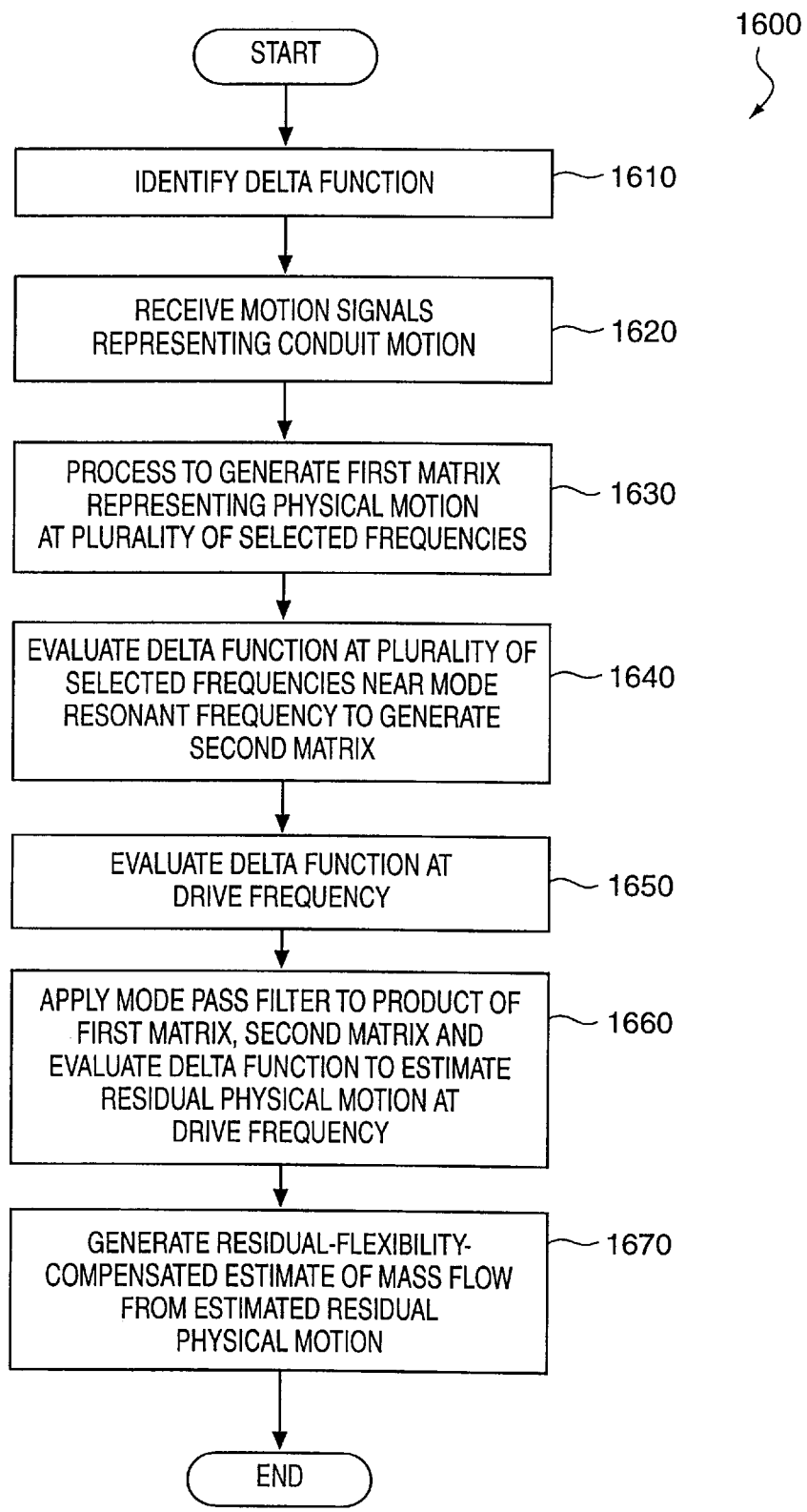

FIG. 16 illustrates exemplary operations 1600 for generating a residual-flexibility-compensated estimate of mass flow in a physical coordinate domain. A delta function describing motion in a real normal mode, e.g., a flow-correlated or other mode, is identified (Block 1610). Motion signals representing conduit motion are received, e.g., motion signals representing conduit motion under a non-zero mass flow condition (Block 1620). The received motion signals are processed to generate a first plurality of values representing the conduit motion at a plurality of selected frequencies (Block 1630). The identified delta function is evaluated at the plurality of selected frequencies to generate a second plurality of values (Block 1640). The delta function is evaluated at the frequency of interest, e.g., the excitation frequency (Block 1650), and a mode pass filter is applied to a product of the first plurality of values, the second plurality of values and the value of the delta function at the frequency of interest to generate an estimate of residual physical motion at the frequency of interest (Block 1660), along the lines of Equation (32) The estimated residual physical motion can then be used to generate a residual-flexibility-compensated estimate of mass flow (Block 1670) using, for example, the techniques described with respect to FIG. 11.

III. Conclusion

According to the present invention, "residual flexibility," i.e., residual motion attributable to off-resonance contributions of real normal modes, is determined by decomposing motion of a vibrating conduit of a mass flow sensor into real normal modal components. A real normal modal residual flexibility component associated with at least one real normal mode of the conduit motion is estimated and used to generate a residual-flexibility-compensated estimate of mass flow.

The real normal modal residual flexibility component may be estimated from signals representing motion of the conduit at a substantially zero mass flow condition. Estimation may be performed in a modal coordinate domain, or by utilizing mode pass filtering in a physical coordinate domain. The real normal modal residual flexibility component may comprise a first component estimated from motion signals representing sensor conduit motion under a substantially zero mass flow condition and a second, "dynamic" component that can be generated from motion signals representing conduit motion under non-zero mass flow conditions. The second component may be dynamically updated under non-zero flow conditions.

According to another aspect of the present invention, a function that describes motion of the vibrating conduit in a real normal mode as function of frequency, e.g., a frequency response or "delta" function, is identified. The function is used to estimate a residual real normal modal component associated with the real normal mode by fitting measurements of actual conduit motion to the function, e.g., by measuring plurality of values of motion of the sensor conduit in a real normal mode at a plurality of selected frequencies and using a least squares technique to determine a mode scaling for the real normal mode. The mode scaling can be used generate an estimate of a real normal modal residual flexibility component.

The real normal modal decomposition utilized according to the present invention can provide more accurate estimates of residual flexibility. The more accurate estimate of residual flexibility can lead, for example, to improved compensation for zero offset in phase or time difference-type mass flow measurements. In addition, according to aspects of the present invention, estimates of residual flexibility can be made without requiring zero mass flow in the sensor conduit.

The drawings and specification of the present application disclose embodiments of the invention. Although specific terms are employed, they are used in a generic and descriptive sense only and not for purposes of limitation. It is expected that persons skilled in the art can and will make, use or sell alternative embodiments that are within the scope of the following claims either literally or under the Doctrine of Equivalents.

That which is claimed is:

1. In a parameter sensor including a conduit configured to contain a material, a method of estimating a process parameter comprising the steps of:
   estimating a real normal modal residual flexibility component associated with a real normal mode of motion of the conduit;
   receiving a plurality of motion signals representing motion of the conduit; and
   generating a residual-flexibility-compensated estimate of mass flow from the received plurality of motion signals and the estimated real normal modal residual flexibility component.

2. A method according to claim 1, further comprising the step of exciting the conduit at an excitation frequency, and:
   wherein said step of estimating a real normal modal residual flexibility component comprises the step of estimating a real normal modal residual flexibility component associated with the real normal mode at the excitation frequency;
   wherein said step of receiving comprises the step of receiving a plurality of motion signals representing motion of the conduit in response to the excitation; and
   wherein said step of generating a residual-flexibility-compensated estimate comprises the steps of:
      determining motion of the conduit at the excitation frequency from the received plurality of motion signals; and
      generating a residual-flexibility-compensated estimate of mass flow from the determined motion at the excitation frequency and the estimated real normal modal residual flexibility component.

3. A method according to claim 2, wherein said step of estimating a real normal modal residual flexibility component comprises the steps of:
   resolving motion of the conduit at the excitation frequency under a substantially zero mass flow condition into a plurality of real normal modal components associated with a plurality of real normal modes; and
   estimating a real normal modal residual flexibility component of the conduit motion associated with a mode of the plurality of real modes from the resolved plurality of real normal modal components.

4. A method according to claim 2, wherein said step of estimating a real normal modal residual flexibility component comprises the steps of:
   identifying a function that describes motion of the conduit in a real normal mode as a function of frequency;
   determining motion of the conduit at a selected frequency; and
   estimating a real normal modal residual flexibility component at the excitation frequency associated with the real normal mode by fitting the determined motion at the selected frequency to the identified function.

5. A method according to claim 4, wherein said step of estimating comprises the steps of:
   determining a scaling transformation that relates the determined motion to the identified function; and
   estimating a real normal modal residual flexibility component at the excitation frequency from the determined scaling transformation.

6. In a parameter sensor including a conduit configured to contain a material, a method of estimating a process parameter comprising the steps of:
   receiving a first plurality of motion signals representing motion of the conduit under a substantially zero mass flow condition;
   processing the received first plurality of motion signals to resolve the motion of the conduit under the substantially zero mass flow condition into a plurality of real normal modal components;
   estimating a real normal modal residual flexibility component from the resolved plurality of real normal modal components;
   receiving a second plurality of motion signals representing motion of the conduit; and
   generating a residual-flexibility-compensated estimate of mass flow from the received second plurality of motion signals and the estimated real normal modal residual flexibility component.

7. A method according to claim 6, wherein said step of processing the received first plurality of motion signals comprises the step of mode pass filtering the received first plurality of motion signals to produce a mode pass filtered representation of the conduit motion under the substantially zero mass flow condition.

8. A method according to claim 7:
   wherein said step of processing the first plurality of motion signals comprises the step of estimating real normal modal motion under the substantially zero mass flow condition;
   wherein said step of estimating a real normal modal residual flexibility component comprises the step of estimating residual real normal modal motion from the estimated real normal modal motion under the substantially zero mass flow condition; and
   wherein said step of generating a residual-flexibility-compensated estimate comprises the steps of:
      estimating real normal modal motion from the received second plurality of motion signals; and
      generating a residual-flexibility-compensated estimate of mass flow under the unknown mass flow condition from the estimated residual real normal modal motion and the estimated real normal modal motion.

9. A method according to claim 6:
   wherein said step of estimating a real normal modal residual flexibility component comprises the step of estimating a first real normal modal residual flexibility component associated with a first real normal mode of conduit motion under the substantially zero mass flow condition;
   wherein said step of estimating a real normal modal residual flexibility component further comprises the step of estimating a second real normal modal residual flexibility component associated with a second real normal mode of conduit motion under a non-zero mass flow condition; and
   wherein said step of generating a residual-flexibility-compensated estimate of mass flow comprises the step of generating a residual-flexibility-compensated estimate of mass flow from the received second plurality of motion signals, the estimated first real normal modal residual flexibility component and the estimated second real normal modal residual flexibility component.

10. A method according to claim 9, wherein the first real normal mode is more highly correlated with flow of material in the conduit than the second real normal mode.

11. A method according to claim 9, wherein said step of estimating a second real normal modal residual flexibility component comprises the steps of:

receiving a third plurality of motion signals representing motion of the conduit under a non-zero mass flow condition; and processing the received third plurality of motion signals to estimate the second real normal modal residual flexibility component.

12. A method according to claim 9, wherein said step of estimating a second real normal modal residual flexibility component comprises the steps of:

identifying a function describing motion in the second real normal mode as a function of frequency; and estimating the second real normal modal residual flexibility component from the identified function.

13. A method according to claim 9:

wherein said step of estimating a real normal modal residual flexibility component comprises the step of generating a first estimate of the second real normal modal residual flexibility component;

wherein said step of generating a residual-flexibility-compensated estimate of mass flow comprises the step of generating a first residual-flexibility-compensated estimate of mass flow from the first estimate of the second real normal modal residual flexibility component;

wherein said step of estimating a real normal modal residual flexibility component comprises the step of generating a second estimate of the second real normal modal residual flexibility component; and wherein said step of generating a residual-flexibility-compensated estimate of mass flow comprises the step of generating a second residual-flexibility-compensated estimate of mass flow from the second estimate of the second real normal modal residual flexibility component.

14. In a parameter sensor including a conduit configured to contain a material, a method of estimating a process parameter comprising the steps of:

identifying a function operative to describe motion of the conduit in a real normal mode as function of frequency;

determining a first value representing motion of the vibrating conduit at a selected frequency;

estimating a real normal modal residual flexibility component associated with the real normal mode by fitting the first value to the identified function;

receiving a plurality of motion signals representing motion of the conduit; and generating a residual-flexibility-compensated estimate of mass flow from the received second plurality of motion signals and the estimated real normal modal residual flexibility component.

15. A method according to claim 14, wherein said step of estimating a real normal modal residual flexibility component comprises the steps of:

determining a scaling transformation relating the first value to the identified function; and estimating a real normal modal residual flexibility component associated with the real normal mode from the identified function and the determined scaling transformation.

16. A method according to claim 15, wherein said step of determining a scaling transformation comprises the steps of:

evaluating the identified function at the selected frequency to generate a second value; and determining a scaling transformation relating the first value to the identified function from the first value and the second value.

17. A method according to claim 16:

wherein said step of determining a first value comprises the step of determining a first plurality of values at a plurality of selected frequencies;

wherein said step of evaluating comprises the step of evaluating the identified function at the plurality of selected frequencies to generate a second plurality of values; and wherein said step of determining a scaling transformation comprises the step of determining a scaling transformation from the first plurality of values and the second plurality of values.

18. A method according to claim 14, wherein the real normal mode comprises a real normal mode substantially correlated with mass flow.

19. A method according to claim 14, further comprising the step of exciting the conduit at an excitation frequency, and wherein said step of estimating a real normal modal residual flexibility component comprises the step of estimating a real normal modal residual flexibility component at the excitation frequency.

20. A method according to claim 19, wherein the real normal mode comprises a real normal mode having a resonant frequency apart from the excitation frequency.

21. A method according to claim 20:

wherein said step of determining a first value comprises the step of determining a first plurality of values at a plurality of selected frequencies near the resonant frequency of the real normal mode; and wherein said step estimating a real normal modal residual flexibility component comprises the step of estimating a real normal modal residual flexibility component associated with the real normal mode by fitting the first plurality of values to the identified function.

22. A method according to claim 14, wherein said step of determining a first value comprises the steps of:

receiving a plurality of motion signals representing motion of the conduit under a unknown mass flow condition; and determining the first value from the received plurality of motion signals representing motion of the conduit under the unknown mass flow condition.

23. A method according to claim 14:

wherein said step of determining a first value comprises the step of determining a first value representing real normal modal motion in the real normal mode; and wherein said step of estimating a real normal modal residual flexibility component comprises the step of estimating residual real normal modal motion in the real normal mode.

24. A method according to claim 23, wherein said step of generating a residual-flexibility-compensated estimate comprises the steps of:

processing the received plurality of motion signals to estimate real normal modal motion of the conduit as a material flows therethrough; and generating a residual-flexibility-compensated estimate of mass flow from the estimated real normal modal motion and the estimated residual real normal modal motion.

25. A method according to claim 17:

wherein said step of identifying a function comprises the step of identifying a plurality of functions;

wherein said step of determining a first value comprises the step of generating a first matrix of values representing real normal modal motion in the real normal mode at a plurality of selected frequencies;

wherein said step of evaluating comprises the step of generating a second matrix of values of the identified function evaluated at the plurality of selected frequencies; and wherein said step of estimating residual real normal modal motion comprises the step of evaluating a real normal modal motion vector at a selected frequency from a product of the first matrix, the second matrix and a vector of values representing the plurality of identified functions evaluated at the selected frequency.

26. A method according to claim 16:

wherein said step of determining a first value comprises the step of determining a first plurality of values representing motion of the conduit at a plurality of selected frequencies;

wherein said step of evaluating comprises the step of evaluating the identified function at the plurality of selected frequencies to generate a second plurality of values; and wherein said step of estimating a real normal modal residual flexibility component comprises the step of estimating residual physical motion associated with the real normal mode from the first plurality of values, the second plurality of values and the identified function.

27. A method according to claim 26, wherein said step of generating a residual-flexibility-compensated estimate comprises the step of:

mode pass filtering the received plurality of motion signals to produce a mode-pass filtered representation of motion of the conduit as a material flows therethrough; and generating a residual-flexibility-compensated estimate of mass flow from the mode pass filtered representation and the estimated residual physical motion.

28. An apparatus for estimating a process parameter associated with a material contained in a vibrating conduit, the apparatus comprising:

a real normal modal residual flexibility component estimator configured to receive motion signals representing motion of the conduit and operative to estimate a real normal modal residual flexibility component associated with a real normal mode of motion of the conduit therefrom; and a residual-flexibility-compensated mass flow estimator responsive to said real normal modal residual flexibility component estimator, configured to receive motion signals representing motion of the conduit and operative to generate a residual-flexibility-compensated estimate of mass flow therefrom according to estimated real normal modal residual flexibility component.

29. An apparatus according to claim 28, and:

wherein said real normal modal residual flexibility component estimator comprises means for estimating a real normal modal residual flexibility component of the conduit associated with the real normal mode at an excitation frequency; and wherein said residual-flexibility-compensated mass flow estimator comprises:

means for determining motion of the conduit at the excitation frequency from a plurality of motion signals representing motion of the conduit responsive to an excitation at the excitation frequency; and means, responsive to said means for determining motion, for generating a residual-flexibility-compensated estimate of mass flow from the determined motion and the estimated real normal modal residual flexibility component.

30. An apparatus according to claim 29, wherein said real normal modal residual flexibility component estimator comprises:

means, responsive to a plurality of motion signals representing motion of the conduit under a substantially zero mass flow condition, for resolving motion of the conduit at the excitation frequency under the substantially zero mass flow condition into a plurality of real normal modal components associated with a plurality of real normal modes; and means, responsive to said resolving means, for estimating a real normal modal residual flexibility component of the conduit motion associated with a real normal mode of the plurality of real normal modes from the resolved plurality of real normal modal components.

31. An apparatus according to claim 29, wherein a real normal modal residual flexibility component estimator comprises:

means for identifying a function that describes motion of the conduit in a real normal mode as a function of frequency;

means, responsive to a plurality of motion signals representing motion of the conduit, for determining motion of the conduit at a selected frequency; and means, responsive to said means for determining motion of the conduit at a selected frequency and to said function identifying means, for estimating a real normal modal residual flexibility component at the excitation frequency associated with the real normal mode by fitting the determined motion at the selected frequency to the identified function.

32. An apparatus according to claim 31, wherein said real normal residual flexibility component estimating means comprises:

means for determining a scaling transformation that relates the determined motion to the identified function; and means, responsive to said scaling transformation determining means, for estimating a real normal modal residual flexibility component at the excitation frequency from the determined scaling transformation.

33. An apparatus for estimating a process parameter associated with a material contained in a conduit, the apparatus comprising:

a real normal modal residual flexibility component estimator, responsive to a first plurality of motion signals representing motion of the conduit under a substantially zero mass flow condition, for processing the first plurality of motion signals to estimate a real normal modal residual flexibility component associated with a real normal mode of motion of the conduit; and a residual-flexibility-compensated mass flow estimator, responsive to a second plurality of motion signals representing motion of the conduit, for generating a residual-flexibility-compensated estimate of mass flow from the second plurality of motion signals and the first estimated real normal modal residual flexibility component.

34. An apparatus according to claim 33, wherein said real normal modal residual flexibility component estimator comprises a mode pass filter operative to filter the first plurality of motion signals to produce a mode pass filtered representation of the conduit motion under the substantially zero mass flow condition.

35. An apparatus according to claim 34:
wherein said real normal modal residual flexibility component estimator comprises:
means for estimating real normal modal motion under the substantially zero mass flow condition from the first plurality of motion signals; and
means for estimating residual real normal modal motion from the estimated real normal modal motion under the substantially zero mass flow condition; and
wherein said residual-flexibility-compensated mass flow estimator comprises:
means for estimating real normal modal motion from the second plurality of motion signals; and
means for generating a residual-flexibility-compensated estimate of mass flow under the unknown mass flow condition from the estimated residual real normal modal motion and the estimated real normal modal motion.

36. An apparatus according to claim 33, further comprising means for estimating a second real normal modal residual flexibility component associated with a second real normal mode of conduit motion under a non-zero mass flow condition; and
wherein said residual-flexibility-compensated mass flow estimator comprises means for generating a residual-flexibility-compensated estimate of mass flow from the received second plurality of motion signals, the estimated first real normal modal residual flexibility component and the estimated second real normal modal residual flexibility component.

37. An apparatus according to claim 36, wherein the first real normal mode is more highly correlated with flow of material in the conduit than the second real normal mode.

38. An apparatus according to claim 36, wherein said means for estimating a second real normal modal residual flexibility component comprises means for processing a third plurality of motion signals representing motion of the conduit under a non-zero mass flow condition to estimate the second real normal modal residual flexibility component.

39. An apparatus according to claim 36, wherein said means for estimating a second real normal modal residual flexibility component comprises:
means for identifying a function describing motion in the second real normal mode as a function of frequency; and
means for estimating the second real normal modal residual flexibility component from the identified function.

40. An apparatus according to claim 36:
wherein said means for estimating a second real normal modal residual flexibility component comprises means for generating a first estimate of the second real normal modal residual flexibility component;
wherein said residual-flexibility-compensated mass flow estimator comprises means for generating a first residual-flexibility-compensated estimate of mass flow from the first estimate of the second real normal modal residual flexibility component;
wherein said means for estimating a second real normal modal residual flexibility component further comprises means for generating a second estimate of the second real normal modal residual flexibility component; and
wherein said residual-flexibility-compensated mass flow estimator further comprises means for generating a second residual-flexibility-compensated estimate of mass flow from the second estimate of the second real normal modal residual flexibility component.

41. An apparatus for estimating a process parameter from motion signals representing motion of a vibrating conduit containing a material, the apparatus comprising:
a real normal modal residual flexibility component estimator including:
means for identifying a function operative to describe motion of the conduit in a real normal mode as function of frequency;
means, responsive to a plurality of motion signals representing motion of the conduit, for determining a first value representing motion of the vibrating conduit at a selected frequency; and
means, responsive to said function identifying means and to said means for determining a first value, for estimating a real normal modal residual flexibility component associated with the real normal mode by fitting the first value to the identified function; and
a residual-flexibility-compensated mass flow estimator, responsive to said real normal modal residual flexibility component estimator, for generating a residual-flexibility-compensated estimate of mass flow from the received second plurality of motion signals and the estimated real normal modal residual flexibility component.

42. An apparatus according to claim 41, wherein said step a real normal modal residual flexibility component estimator comprises:
means for determining a scaling transformation relating the first value to the identified function; and
means for estimating a real normal modal residual flexibility component associated with the real normal mode from the identified function and the determined scaling transformation.

43. An apparatus according to claim 42, wherein said means for determining a scaling transformation comprises:
means for evaluating the identified function at the selected frequency to generate a second value; and
means for determining a scaling transformation relating the first value to the identified function from the first value and the second value.

44. An apparatus according to claim 43:
wherein said step of determining a first value comprises the step of determining a first plurality of values at a plurality of selected frequencies;
wherein said means for evaluating comprises means for evaluating the identified function at the plurality of selected frequencies to generate a second plurality of values; and
wherein means for determining a scaling transformation comprises means for determining a scaling transformation from the first plurality of values and the second plurality of values.

45. An apparatus according to claim 41, wherein the real normal mode comprises a real normal mode substantially correlated with mass flow.

46. An apparatus claim 41, wherein said real normal modal residual flexibility component estimating means comprises means for estimating a real normal modal residual flexibility component at an excitation frequency responsive to excitation of the conduit at the excitation frequency.

47. An apparatus according to claim 46, wherein the real normal mode comprises a real normal mode having a resonant frequency apart from the excitation frequency.

48. An apparatus according to claim 47:
wherein said means for determining a first value comprises means for determining a first plurality of values at a plurality of selected frequencies near the resonant frequency of the real normal mode; and wherein said means for estimating a real normal modal residual flexibility component comprises means for estimating a real normal modal residual flexibility component associated with the real normal mode by fitting the first plurality of values to the identified function.

49. An apparatus according to claim 41, wherein said means for determining a first value comprises means for determining the first value from a plurality of motion signals representing motion of the conduit under a unknown mass flow condition.

50. An apparatus according to claim 41:

wherein said means for determining a first value comprises means for determining a first value representing real normal modal motion in the real normal mode; and wherein said step of means for estimating a real normal modal residual flexibility component comprises means for estimating residual real normal modal motion in the real normal mode.

51. An apparatus according to claim 50, wherein said residual-flexibility-compensated mass flow estimator comprises:

means for processing a plurality of motion signals to estimate real normal modal motion of the conduit as a material flows therethrough; and means for generating a residual-flexibility-compensated estimate of mass flow from the estimated real normal modal motion and the estimated residual real normal modal motion.

52. An apparatus according to claim 44:

wherein said means for identifying a function comprises means for identifying a plurality of functions;

wherein said means for determining a first value comprises means for generating a first matrix of values representing real normal modal motion in the real normal mode at a plurality of selected frequencies;

wherein said means for evaluating comprises means for generating a second matrix of values of the identified function evaluated at the plurality of selected frequencies; and wherein said means for estimating residual real normal modal motion comprises means for evaluating a real normal modal motion vector at a selected frequency from a product of the first matrix, the second matrix and a vector of values representing the plurality of identified functions evaluated at the selected frequency.

53. An apparatus according to claim 43:

wherein said means for determining a first value comprises means for determining a first plurality of values representing motion of the conduit at a plurality of selected frequencies;

wherein said means for evaluating comprises means for evaluating the identified function at the plurality of selected frequencies to generate a second plurality of values; and wherein said means for estimating a real normal modal residual flexibility component comprises means for estimating residual physical motion associated with the real normal mode from the first plurality of values, the second plurality of values and the identified function.

54. An apparatus according to claim 53, wherein said residual-flexibility-compensated mass flow estimator comprises:

a mode pass filter operative to filter a plurality of motion signals to produce a mode-pass filtered representation of motion of the conduit as a material flows therethrough; and means for generating a residual-flexibility-compensated estimate of mass flow from the mode pass filtered representation and the estimated residual physical motion.

55. A computer program product for estimating a process parameter associated with a material contained in a conduit, the computer program product comprising:

a computer readable storage medium having computer readable program code means embodied in said medium, said computer readable program code means comprising:

first computer-readable program code means for storing motion signals representing motion of the conduit;

second computer-readable program code means, responsive to said first computer-readable program code means, for estimating a real normal modal residual flexibility component associated with a real normal mode of motion of the conduit; and third computer-readable program code means, response to said first computer-readable program code means and to said second computer-readable program code means, for generating a residual-flexibility-compensated estimate of mass flow from stored motion signals and the estimated real normal modal residual flexibility component.

56. A computer program product according to claim 55:

wherein said second computer-readable program code means comprises computer-readable program code means for estimating a real normal modal residual flexibility component associated with the real normal mode at an excitation frequency; and wherein said third computer-readable program code means comprises:

computer-readable program code means for determining motion of the conduit at the excitation frequency from stored motion signals; and computer-readable program code means for generating a residual-flexibility-compensated estimate of mass flow from the determined motion at the excitation frequency and the estimated real normal modal residual flexibility component.

57. A computer program product according to claim 56, wherein said second computer-readable program code means comprises:

computer-readable program code means, responsive to stored motion signals representing conduit motion under a substantially zero mass flow condition, for resolving motion of the conduit at the excitation frequency under the substantially zero mass flow condition into a plurality of real normal modal components associated with a plurality of real normal modes; and computer-readable program code means for estimating a real normal modal residual flexibility component of the conduit motion associated with a mode of the plurality of real modes from the resolved plurality of real normal modal components.

58. A computer program product according to claim 56, wherein said second computer-readable program code means comprises:

computer-readable program code means for identifying a function that describes motion of the conduit in a real normal mode as a function of frequency;

computer-readable program code means for determining motion of the conduit at a selected frequency; and computer-readable program code means for estimating a real normal modal residual flexibility component at the excitation frequency associated with the real normal mode by fitting the determined motion at the selected frequency to the identified function.

59. A computer program product according to claim 56, wherein said second computer-readable program code means comprises:

computer-readable program code means for determining a scaling transformation that relates the determined motion to the identified function; and computer-readable program code means for estimating a real normal modal residual flexibility component at the excitation frequency from the determined scaling transformation.

* * * * *

UNITED STATES PATENT AND TRADEMARK OFFICE
CERTIFICATE OF CORRECTION

PATENT NO. : 6,272,438 B1  
DATED : August 7, 2001  
INVENTOR(S) : Cunningham, Timothy J., Normen, David F. and Shelley, Stuart J.

Page 1 of 1

It is certified that error appears in the above-identified patent and that said Letters Patent is hereby corrected as shown below:

<u>Column 16,</u>  
Line 44 replace

"  $$H(j\omega) = \sum_{r=1}^{N}\left[\frac{\Phi_r \cdot Q_r \cdot \Phi_r^T}{j\omega + \lambda_r} + \frac{\Phi_r \cdot Q^*_r \cdot \Phi^T}{j\omega - \lambda_r^*}\right]. \qquad (20)"$$

with

--  $$H(j\omega) = \sum_{r=1}^{N}\left[\frac{\Phi_r \cdot Q_r \cdot \Phi_r^T}{j\omega - \lambda_r} + \frac{\Phi_r \cdot Q^*_r \cdot \Phi^T}{j\omega - \lambda_r^*}\right]. \qquad (20)--$$

Signed and Sealed this

Twenty-first Day of May, 2002

Attest:

*Attesting Officer*

JAMES E. ROGAN  
*Director of the United States Patent and Trademark Office*